US009355416B2

(12) United States Patent
Graziano

(10) Patent No.: US 9,355,416 B2
(45) Date of Patent: May 31, 2016

(54) FORWARD PATH MULTI-MEDIA MANAGEMENT SYSTEM WITH END USER FEEDBACK TO CENTRAL CONTENT SOURCES

(76) Inventor: James Michael Graziano, Hotchkiss, CO (US)

( * ) Notice: Subject to any disclaimer, the term of this patent is extended or adjusted under 35 U.S.C. 154(b) by 1475 days.

(21) Appl. No.: 12/675,356

(22) PCT Filed: Aug. 31, 2007

(86) PCT No.: PCT/US2007/077421
§ 371 (c)(1),
(2), (4) Date: Feb. 25, 2010

(87) PCT Pub. No.: WO2009/029112
PCT Pub. Date: Mar. 5, 2009

(65) Prior Publication Data
US 2011/0188415 A1 Aug. 4, 2011

(51) Int. Cl.
*G06Q 30/04* (2012.01)
*G06Q 30/02* (2012.01)
*H04N 7/173* (2011.01)
(Continued)

(52) U.S. Cl.
CPC ............... *G06Q 30/04* (2013.01); *G06Q 30/02* (2013.01); *H04N 7/17327* (2013.01); *H04N 21/252* (2013.01); *H04N 21/25808* (2013.01); *H04N 21/42202* (2013.01); *H04N 21/475* (2013.01); *H04N 21/6112* (2013.01);
(Continued)

(58) Field of Classification Search
CPC ... G06Q 30/04; G06Q 30/02; H04N 21/6405; H04N 21/475; H04N 21/854; H04N 21/6112; H04N 21/6162; H04N 21/252; H04N 21/25808; H04N 21/42202; H04N 21/6587; H04N 7/17327
USPC .................... 370/310, 352; 455/508; 375/316
See application file for complete search history.

(56) References Cited

U.S. PATENT DOCUMENTS 5,697,844 A 12/1997 Von Kohorn
6,447,396 B1 9/2002 Galyean, III et al.
(Continued)

FOREIGN PATENT DOCUMENTS

WO WO-2004084444 A1 9/2004

OTHER PUBLICATIONS

International Search Report in PCT Application Serial No. PCT/US07/077382 dated Apr. 15, 2008, 4 pages.
(Continued)

*Primary Examiner* — Andrew Lai
*Assistant Examiner* — Chuong M Nguyen

(57) ABSTRACT

The Forward Path Multi-Media Management System architecture enables end user devices to share a common wireless forward path of a multicast communication architecture in which the forward path delivered content is dynamically changed or modified based on a real-time, near-real-time, or delay-time basis via aggregated reverse path feedback from at least one of a plurality of end user devices. The Forward Path Multi-Media Management System periodically or continuously aggregates the feedback input received via the reverse path (having wired and/or wireless connectivity), modifies the forward path multi-media content, and delivers this dynamically modified multi-media content to the then connected population of end user devices via a wireless forward path multicast in a repetitive closed loop fashion.

22 Claims, 14 Drawing Sheets

(51) Int. Cl.

| | | |
|---|---|---|
| *H04N 21/25* | (2011.01) | |
| *H04N 21/258* | (2011.01) | |
| *H04N 21/422* | (2011.01) | |
| *H04N 21/475* | (2011.01) | |
| *H04N 21/61* | (2011.01) | |
| *H04N 21/6405* | (2011.01) | |
| *H04N 21/6587* | (2011.01) | |
| *H04N 21/854* | (2011.01) | |

(52) U.S. Cl.
CPC ...... *H04N 21/6162* (2013.01); *H04N 21/6405* (2013.01); *H04N 21/6587* (2013.01); *H04N 21/854* (2013.01)

(56) References Cited

U.S. PATENT DOCUMENTS

| | | | |
|---|---|---|---|
| 6,594,498 | B1 | 7/2003 | McKenna et al. |
| 6,681,115 | B1 | 1/2004 | McKenna et al. |
| 6,954,641 | B2 | 10/2005 | McKenna et al. |
| 7,480,727 | B2 | 1/2009 | Domschitz |
| 7,546,118 | B2 | 6/2009 | Camp, Jr. |
| 2002/0034980 | A1 | 3/2002 | Lemmons et al. |
| 2002/0057670 | A1* | 5/2002 | Kerns et al. .................. 370/352 |
| 2002/0143901 | A1 | 10/2002 | Lupo et al. |
| 2003/0018970 | A1 | 1/2003 | McKenna |
| 2003/0163482 | A1 | 8/2003 | Bunney et al. |
| 2003/0208613 | A1 | 11/2003 | Signes et al. |
| 2004/0002049 | A1 | 1/2004 | Beavers et al. |
| 2004/0031052 | A1 | 2/2004 | Wannamaker et al. |
| 2005/0010653 | A1 | 1/2005 | McCanne |
| 2005/0027648 | A1 | 2/2005 | Knowles et al. |
| 2005/0039210 | A1 | 2/2005 | Dusenberry et al. |
| 2006/0080360 | A1 | 4/2006 | Young et al. |
| 2006/0099981 | A1* | 5/2006 | McKenna et al. ............. 455/508 |
| 2006/0248013 | A1 | 11/2006 | Ebert et al. |
| 2006/0253601 | A1 | 11/2006 | Vedantham et al. |
| 2006/0259469 | A1 | 11/2006 | Chiu |
| 2007/0113179 | A1 | 5/2007 | Gibbs et al. |
| 2007/0168490 | A1 | 7/2007 | Kent et al. |
| 2007/0174887 | A1 | 7/2007 | Hu et al. |
| 2008/0165895 | A1* | 7/2008 | Lesser et al. ................. 375/316 |

OTHER PUBLICATIONS

International Search Report in PCT Application Serial No. PCT/US07/077395 dated Sep. 17, 2008, 4 pages.
International Search Report in PCT Application Serial No. PCT/US07/077405 dated Apr. 23, 2008, 4 pages.
International Search Report in PCT Application Serial No. PCT/US07/077409 dated Apr. 18, 2008, 4 pages.
International Search Report in PCT Application Serial No. PCT/US07/077417 dated Apr. 1, 2008, 3 pages.
International Search Report in PCT Application Serial No. PCT/US07/077421 dated Mar. 14, 2008, 4 pages.
International Search Report in PCT Application Serial No. PCT/US07/077425 dated Mar. 17, 2008, 4 pages.

* cited by examiner

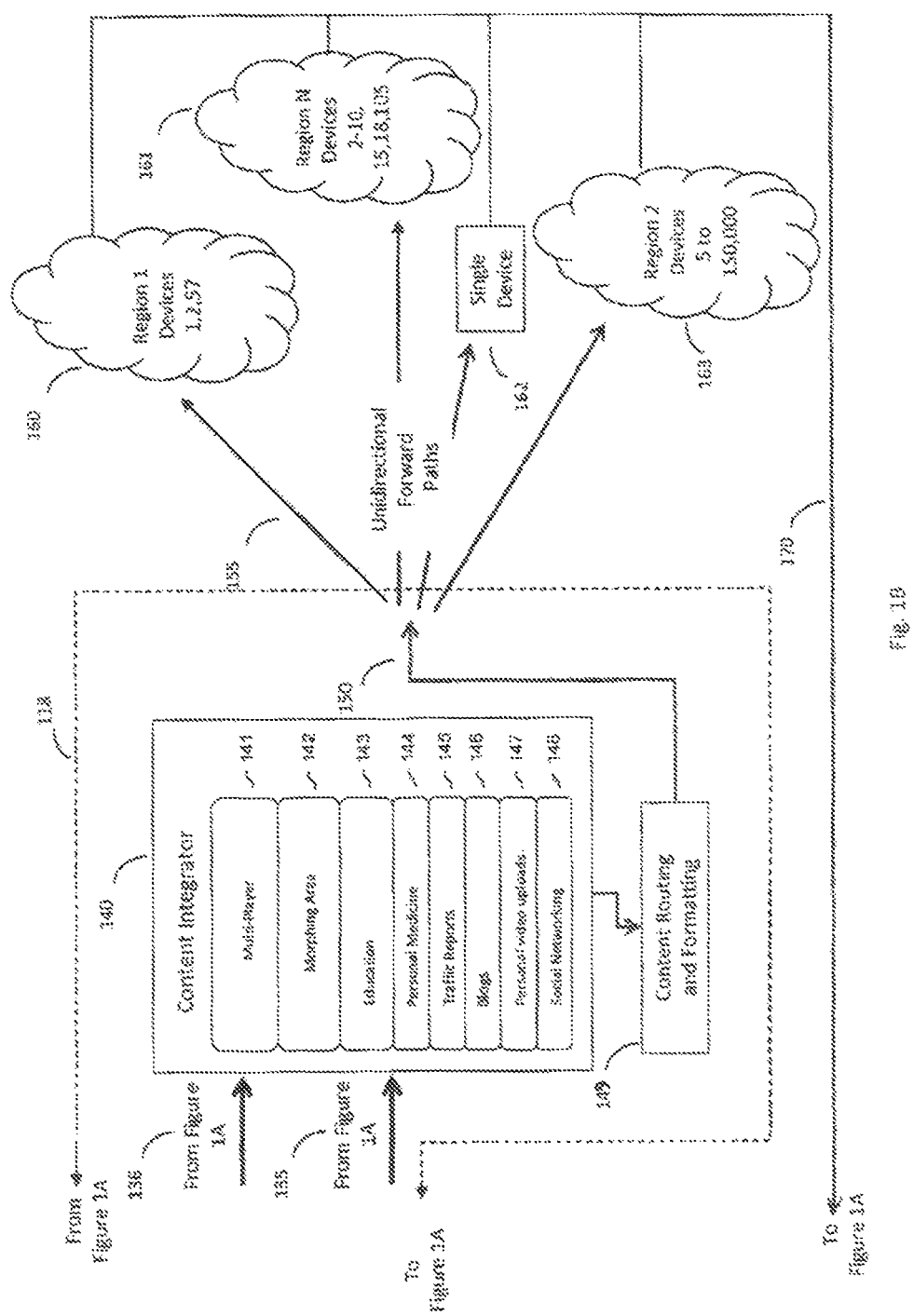

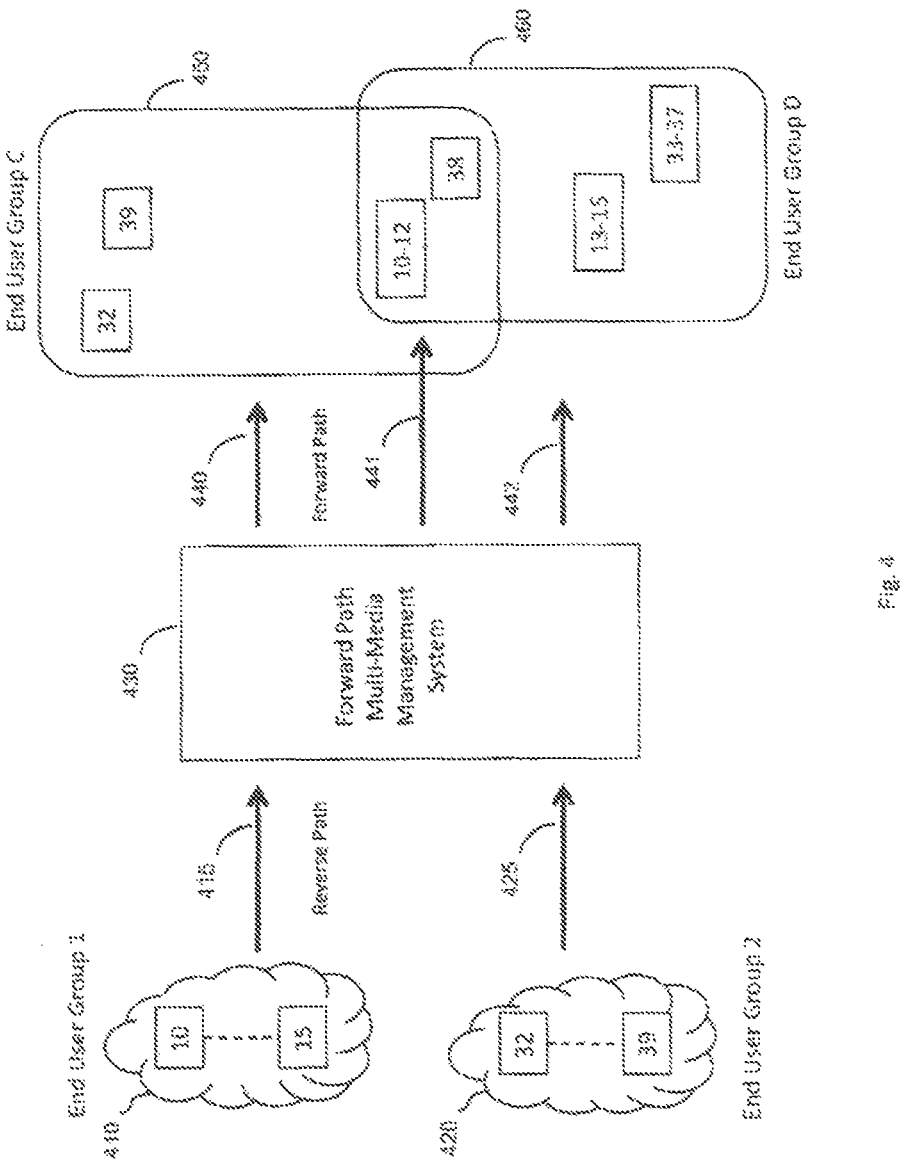

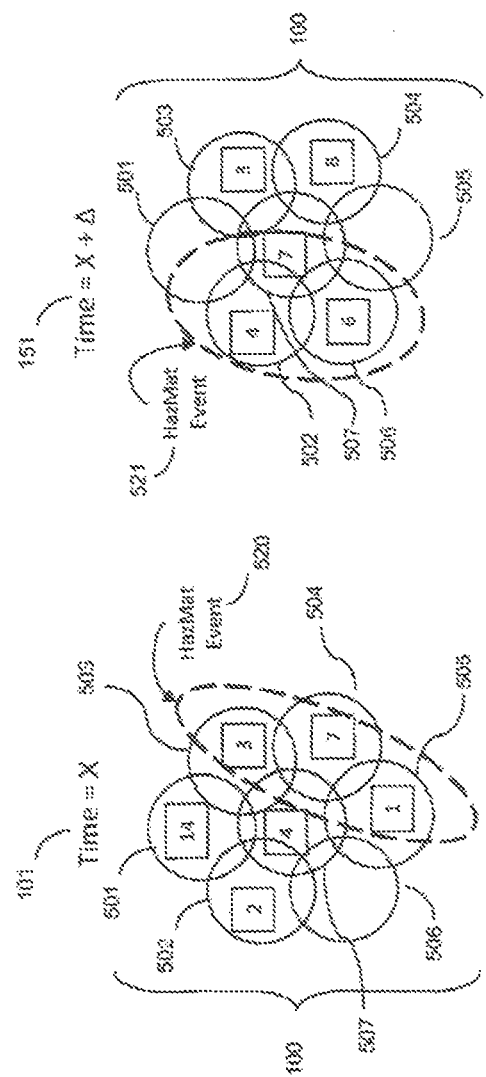

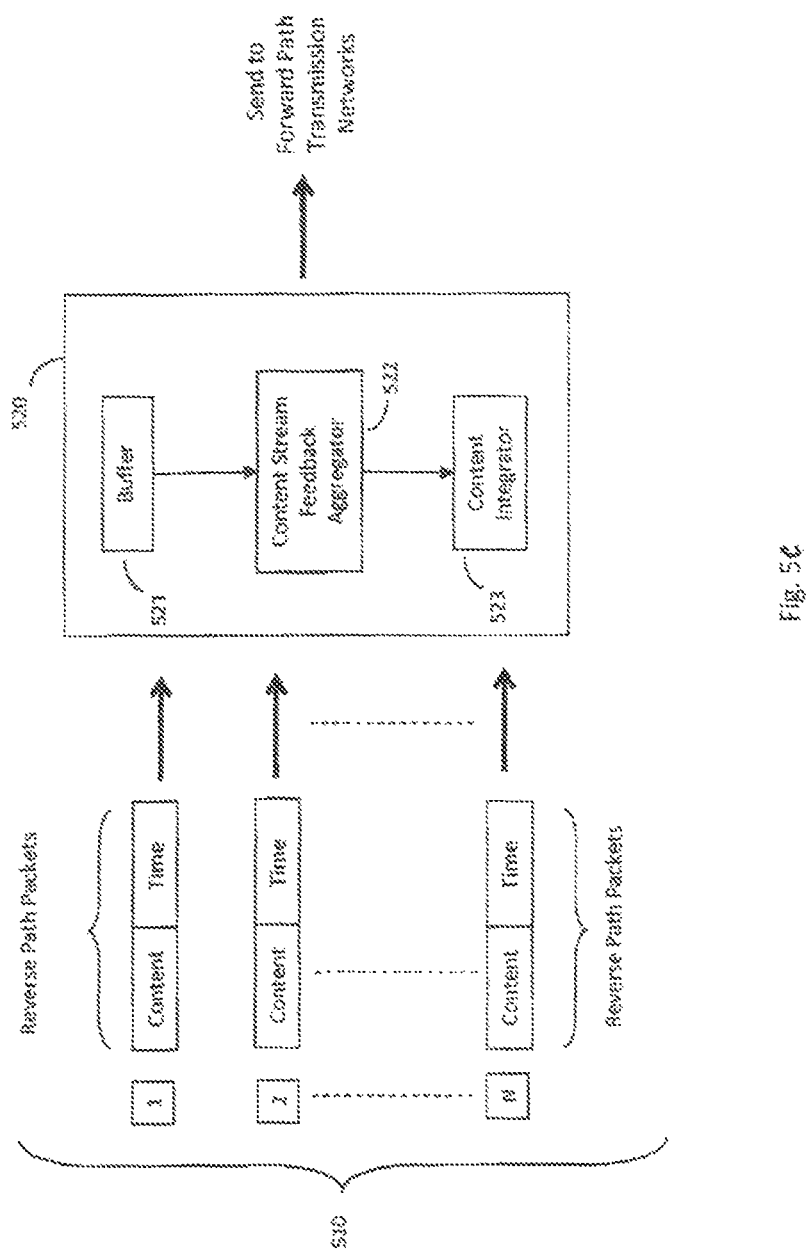

FORWARD PATH MULTI-MEDIA MANAGEMENT SYSTEM WITH END USER FEEDBACK TO CENTRAL CONTENT SOURCES

CROSS-REFERENCES TO RELATED APPLICATIONS

This application is a national stage of PCT Patent Application No. PCT/US07/077421 filed Aug. 31, 2007, and is hereby incorporated by reference to the same extent as though fully disclosed herein. This application is a national stage of PCT Patent Application No. PCT/US07/077421 filed Aug. 31, 2007, and is hereby incorporated by reference to the same extent as though fully disclosed herein. This application also is related to applications titled "Transaction Management System In A Multicast Or Broadcast Wireless Communication Network" filed concurrently herewith; "Forward Path Multi-Media Management System With End User Feedback To Distributed Content Sources" filed concurrently herewith; "Communication Network For A Multi-Media Management System With End User Feedback" filed concurrently herewith; "Gaming System With End User Feedback For A Communication Network Having A Multi-Media Management" filed concurrently herewith; "Gaming Device For Multi-Player Games" filed concurrently herewith; and "Virtual Aggregation Processor For Incorporating Reverse Path Feedback Into Content Delivered On A Forward Path", filed concurrently herewith.

FIELD OF THE INVENTION

This invention relates to a Forward Path Multi-Media Management System which enables feedback via the reverse path (end user device to network direction) from at least one of a plurality of end users who are capable of influencing, modifying, or changing the delivered multi-media content in the forward path (network to end user device direction) being delivered via a wireless multicast communication network.

BACKGROUND OF THE INVENTION

Multi-media content such as video, music, or data is delivered in a well-known fashion via wired or wireless networks to end user devices such as HDTVs, music play-back systems, or portable mobile devices. The multi-media content delivery network could be via satellite, cable, DSL, internet, WiFi, cellular, MediaFLO, WiMax, and so on. These networks have unique characteristics of speed, efficiency, reliability, availability, and capacity. For example, satellite is more efficient for large geographic regions but suffers from diminished content distinction from one region to the next; that is, there is minimal content diversity, and it is expensive and difficult to do high granularity regional or demographic content targeting in a satellite architecture. In contrast, cable TV has regional and neighborhood targeting attributes but is often bandwidth or capacity constrained, thereby limiting the number of high bandwidth HDTV signals it can carry, for example.

What is needed is a network architecture that combines the two strengths of cable and satellite—targeting and capacity, respectively. An architectural advantage of wireless terrestrial networks is high capacity and targeted delivery. A terrestrial wireless network can deliver multi-media content to more than one end user or subscriber at the same time, thereby realizing high levels of network efficiency. In addition, terrestrial wireless networks are high bandwidth and high capacity. Thus, a terrestrial wireless network has attributes of both cable TV and satellite—the terrestrial wireless network has high capacity and regional/demographic targeting. The terrestrial wireless network delivery method is called broadcast, multicast, or narrowcast and has at least one end user (subscriber) and associated end user device receiving the broadcasted content, and thereby derives its high efficiency when more than one end user receives the same content in a simultaneous fashion.

Wireless multicast service in a wireless communication network facilitates the sharing of a single air interface channel by multiple end users. The single wireless air interface channel, logical or physical, extends from the base station radio transmitter in the wireless communication network to a subscriber's wireless end user device, wherein the single wireless air interface channel comprises the forward path (network to end user device direction) that carries the multicast multi-media content. A plurality of end user devices thereby concurrently receives the multi-media content on the same forward path channel. While the multicast process is well taught in the art, the delivered multi-media content, information, or data (collectively termed "content" or "multi-media content" herein) is static in nature and is simply a replica of the source content, less any transmission or coding errors. The wirelessly multicast source content is immutable and does not have end user interaction or feedback.

Web 2.0 services strive to engage the subscriber (end user) population in a dynamic fashion with feedback, comments, and so on. This comment or feedback path is to the sub-population of subscribers of a particular interest group and is accomplished in the Internet paradigm, a one-to-one Internet protocol connection. Thus, the classic Internet and even Web 2.0, while realizing high targeting and subscriber feedback, does not achieve high delivery efficiency since the connections are one-to-one in nature.

New wireless multi-media content delivery architectures, such as MediaFLO ("Media ForwardLinkOnly") and DVB-H (Digital Video Broadcast-Handheld), function by using a broadcast architecture in the forward path to produce a pseudo-multicast delivery and concurrently disseminate multi-media content to a plurality of wireless end user devices on a single air interface channel. In these architectures (also termed "multicast" herein), a unidirectional multi-media wireless broadcast network transmits multi-media content to selected authorized wireless end user devices in a time concurrent fashion. However, there is no interconnection, interaction, or feedback between the end users and their associated end user devices with this multicasted multi-media content stream. The forward path content is completely and totally static in its nature. The delivered multi-media content is essentially no different than UHF or VHF broadcasted television, other than it can be received on small portable digital devices.

The MediaFLO and DVB-H multi-media wireless architectures, therefore, are static in their user interface, since there is no interactivity or feedback between delivered multi-media content and the end user. The multicasted content is invariant or immutable in its extent. That is, whatever is delivered to the wireless network for transmission to the end user population is delivered as an exact replica, untouched and unmodified from its original form. This is a distinct and inherent limitation of the present wireless multicasting art (even though multicasting is efficient and targeted).

The present wireless multicasting art does not enable or permit end users, via their associated end user devices, to modify the multi-media content carried on the forward path in any manner. Still, there are numerous applications wherein the ability to modify the forward path multicast content based on end user (subscriber) input or actions would be highly desired. What is needed is a novel adaptation of a wireless multicast network that enables end user interaction and modification of the forward path delivered multi-media content.

In this new architecture, the end user population would have an unprecedented ability to communicate data and knowledge via the reverse path, a capability heretofore unavailable. The scope and diversity of these end user driven applications, while virtually unlimited, include: multiplayer gaming, emergency events, education, medicine, live sporting events, automobile traffic congestion reports, and the like. This interactivity could be embodied in numerous forms to include, but not be limited to: opinion polling, purchase processing, public safety, social networking, or any other instance where it would be useful to have the content being delivered on the forward path modified based on end user feedback or interaction.

Thus, the state of the wireless multicasting art does not enable the capability to dynamically modify the content delivered on the forward path via aggregated feedback or input from at least one of a plurality of end users via their associated end user devices. No system heretofore has envisioned engaging the end user to directly and actively influence the delivered multicasted content.

BRIEF SUMMARY OF THE INVENTION

An advance is realized over the present wireless multicasting art with the present Forward Path Multi-Media Management System, which enables a reverse path feedback architecture, wherein the forward path multicasted content can be dynamically modified as a result of end user interaction or feedback.

In the Forward Path Multi-Media Management System architecture, end user devices share a common wireless forward path of a multicast communication architecture in which the forward path delivered content is dynamically changed or modified based on a real-time, near-real-time, or delay-time basis via aggregated reverse path feedback from at least one of a plurality of end user devices. The Forward Path Multi-Media Management System periodically or continuously aggregates the feedback inputs received via the reverse path (having wired and/or wireless connectivity), modifies the forward path multi-media content, and delivers this dynamically modified multi-media content to the then connected population of end user devices via a wireless forward path multicast in a repetitive closed loop fashion.

The Forward Path Multi-Media Management System aggregates the reverse path feedback from the end user device or devices and then processes this feedback data in context with the streamed forward path content. For example, if the application is a multiplayer game, the Forward Path Multi-Media Management System receives the end user's reverse path feedback data which defines how their avatar or in-game virtual person should react or behave at a given point within the game. This feedback is sent to the Forward Path Multi-Media Management System via wired or wireless means. The Forward Path Multi-Media Management System, in this gaming example, aggregates and delivers the "combined feedback" of all the connected end users for that moment in rime to the gaming software application. The gaming software application then modifies its streamed forward path content according to the latest "combined feedback". The wireless multicast network then delivers the latest video frames or sequence of successive game image frames of the game session (to include sound) to the participating end users based on the "combined feedback". The wireless multicast can be delivery targeted to regionally or locally grouped end user sub-populations to enhance the overall network efficiency. This process repeats in a continuous fashion, with continuous N+1 events of "combined feedback" delivered to the software application, which in turn modifies the streamed forward path content.

The Forward Path Multi-Media Management System in general relates to any application that has at least one end user but preferably a plurality of end users wherein each end user has periodic reverse path feedback content coupled with a bandwidth intensive forward path data stream from a central source that can concurrently wirelessly deliver the given data stream to all respective sub-populations, each having their own multicast, and in aggregate the Forward Path Multi-Media Management System serves the entire population (thereby realizing substantial networking efficiencies). The number of applications that fit this set of networking attributes is virtually limitless. This is described in substantially more detail in the following figures and specification where the interrelationships and interconnections are examined.

End users in the Forward Path Multi-Media Management System can be grouped via location or region, together with personal attributes such as demographic, socio-graphic, or psychographic interests as it relates to a given multicasted content stream. The pairing of physical location groupings with personal interest attributes enables new and novel telecommunication services with the attendant advantage of extremely efficient delivery. The wireless communication network's capacity utilization, both in terms of assets and spectrum, is very high.

For example, the Forward Path Multi-Media Management System is ideally suited to blogging and social networking. In a social networking application, personal devices such as a cell phone with cellular or WiFi or WiMax connectivity are now capable of connecting to a social network with extremely high efficiency since the forward path link, which is generally more bandwidth intensive, is shared as a "grouped multicast". The social network can be specifically targeted as a given demographic, socio-graphic, or psychographic interest group. Social networks are often a "thin-thick pipe" in their networking requirements. That is, the reverse path data from any given end user is less bandwidth intensive, but the streamed content back to the population of end users in a given social network is generally more bandwidth intensive. Thus, social networks ideally fit the networking profile of the present Forward Path Multi-Media Management System. Social networks may be more personal in nature, i.e., a close group of friends or a ski club, or they could be international in their extent.

Another application having similar attributes to a social network is the corporate environment. One example would be a construction site which is generally geographically contained, thereby satisfying the concurrent wireless delivery requirement for the forward path multicast. At the construction site, workers can provide data on progress for a given task which are then aggregated, and the project plan is updated and multicast back to the entire construction team. This would offer the team real-time feedback on critical areas or critical paths that may be delaying overall progress. Another application would be a big box store such as WalMart™ or other large retailer or a shopping mall. In the retailing applications, the end user who is our shopping could be the "customer" of the Forward Path Multi-Media Management System receiving live sales event data via multicast, and the "customer" could provide data back to the "population" of end users with information as to where the best shopping bargains are located, in their opinion. The employees of the various stores in the shopping mall could also have an intra-network just for their store where they are seeing in real-time how well their sales promotion is working. Any "sales oriented" multicast, where the ultimate price paid for the goods or services being offered is determined by the number of buyers acting on the multicast offer, could use this architecture. Thus, a strong buyer response could, in effect, trigger a "volume" discount, live-on-the-spot, and the more buyers who participate, the less expensive a given product becomes. Furthermore, buyers who purchased the item early in the "real-time-discount" cycle could receive a rebate or in-store credit. Mass merchandising now becomes targeted, and the buyers have virtual collective bargaining power, thereby garnering substantial discounts. Both the retailer and the customer win.

In the Forward Path Multi-Media Management System architecture, the reverse path (end user to network direction) can be wired or wireless. Thus, the reverse path has flexibility in terms of its connectivity as well as the relative speed of its connection. For instance, a computer connected to a home or office LAN can use their personal LAN network for reverse path connectivity to the Forward Path Multi-Media Management System. However, to realize the forward path efficiencies of concurrent delivery of the streamed content, the computer also has the ability to wirelessly receive the concurrent forward path for its sub-population geographic grouping via cellular, WiFi, WiMax, MediaFLO, DVB-H, or some other wireless means. Alternatively, if the reverse path is wireless only, the end user device could use the same network as the forward path stream, such as in a WiFi or WiMax network; or it could be a hybrid of WiFi or cellular in the reverse path and MediaFLO in the forward path. The end user device could be a PC, a PDA, a cell phone, or some specialized device like a video game controller. Thus, the Forward Path Multi-Media Management System architecture is not limited to any one configuration.

Public safety applications are another area where this telecommunication architecture excels. On congested urban highways, end users provide via a reverse path feedback loop their GPS location, speed, and traffic flow trend data to the Forward Path Multi-Media Management System. This data can be autonomously sent machine-to-machine or end user initiated. The Forward Path Multi-Media Management System aggregates the sub-population data, creates a traffic flow map for that moment in time, and re-delivers this traffic flow map to the then connected population of end users in a given multicast region via a shared forward path channel (thereby dramatically enhancing efficiency). In this manner, all of the motorists know the traffic situation in real-time. The system could even have intelligence to select alternate routings, measure how many autos take the alternate route, see if the alternate route's efficiency has changed, and then suggest a new alternate route or routes.

Another public safety application involves the measurement of and changing impact region of a physical phenomenon, such as a bio-hazard, chemical hazard, or terrorist event. For example, a train carrying tanker cars of chlorine derails as it is leaving a chemical facility and the tanks of chlorine leak gas within the area of production facility, but a city is downwind of the growing plume. Pre-installed sensors at the chemical production facility relay, via the wired or wireless reverse path, the level of airborne chlorine contamination in a real-time fashion; and the Forward Path Multi-Media Management System aggregates and processes this data stream and sends out a map of the contamination plume via a forward path wireless multicast to all the workers at the production facility. The map of the plume's extent is updated in real-time as the plume spreads. Chemical facility personnel are now better protected and have better information to properly respond to the accident. As the plume spreads to the nearby city, and if ordinary citizen cell phones were equipped with sensors to detect and report the level of contamination of an airborne hazardous substance, the plume would continue to be mapped and reported back via multicast. The technology to incorporate sensors into wireless devices is readily available. Most important, these plume map reports would be sent to public safety personnel and ordinary citizens, although each group might receive a different multicast based on their needs. In particular, for the citizen population, an evacuation order is sent via multicast to include the evacuation directive and roads to take. The potential deadly impact of the accident is greatly minimized and timely information on the plume's direction, strength, and size dramatically improves actions taken during the emergency. Since the map of the plume is multicasted, the cellular, WiFi, WiMax, MediaFLO, or DVB-H network is not overcome with emergency related point-to-point telecommunication traffic, since cellular networks are not designed to handle enormous spikes in traffic volume associated with an emergency or natural disaster event.

The Forward Path Multi-Media Management system solves a complex problem resident in existing telecommunication architectures by combining reverse path feedback with forward path multicasting in numerous novel ways to achieve high delivery efficiency, high subscriber targeting, and continuous content modification ensuring high relevancy.

BRIEF DESCRIPTION OF THE DRAWINGS

FIGS. 1A and 1B illustrate, in block diagram form, the overall architecture of a typical Forward Path Multi-Media Management System;

FIG. 4 illustrates, in block diagram form, where the user groups creating the content can receive their own collective modified content or content from other user groups;

FIGS. 5A and 5B illustrate, in block diagram form, the Forward Path Multi-Media Management System's response to a HazMat (Hazardous Materials) event;

FIG. 5C illustrates, in block diagram form, the time alignment of reverse path data to insure forward path modification accuracy;

DETAILED DESCRIPTION OF THE INVENTION

Philosophy of the Multicast Wireless Communication System

An exemplary narrowcast technology is described in detail in U.S. Pat. No. 6,594,498 and U.S. Pat. No. 6,681,115, for example; and this technology can be used to implement narrowcast communications to wireless end user devices where the narrowcast is a highly targeted "multicast" to geographic and/or demographic end user groupings. The term "narrowcast" as used in these patents is considered a form of multicasting.

Forward Path Multi-Media Management Philosophy

Figure 1A:
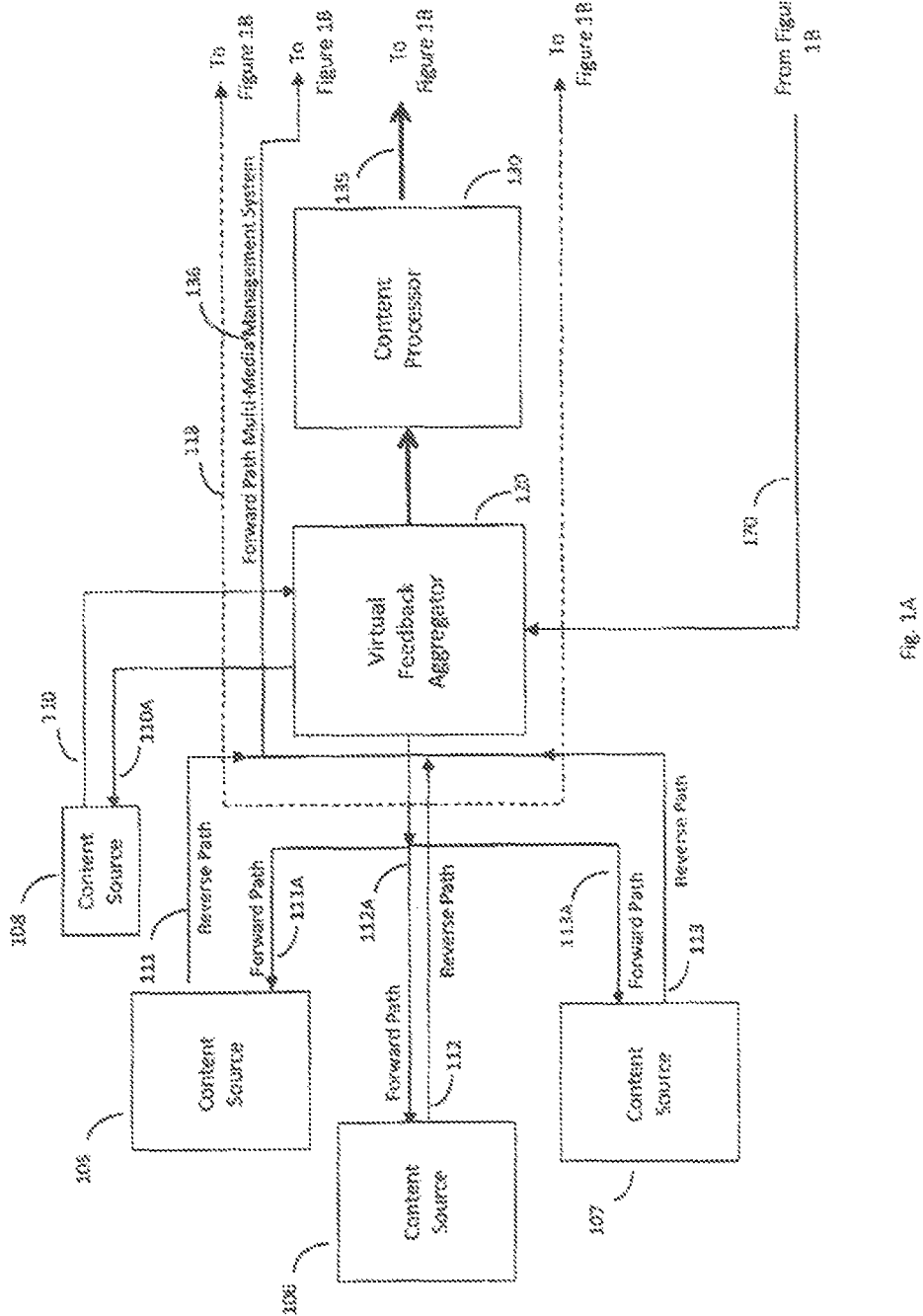
Figure 1C:
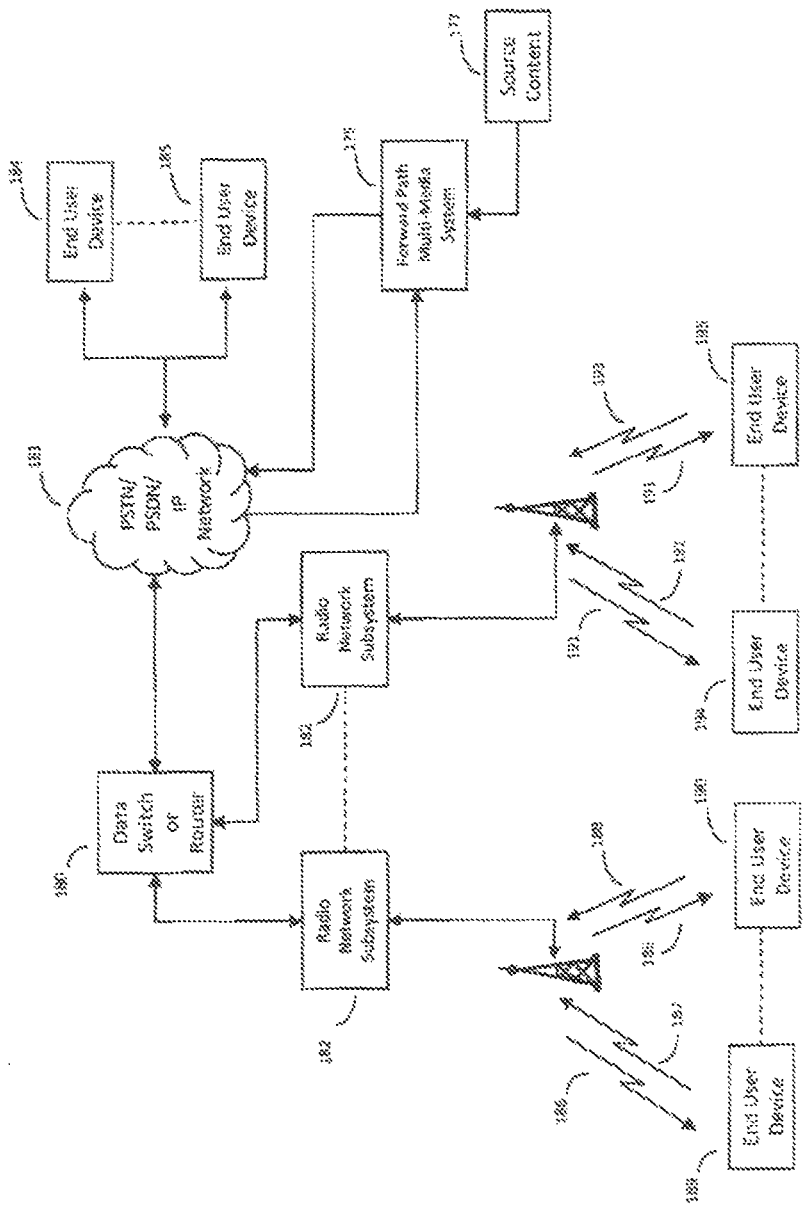
FIG. 1C illustrates an example physical wireless network with reverse path modification of the forward path.

The overall architecture of the Forward Path Multi-Media Management System is illustrated in FIGS. 1A and 1B, which depict a logical or functional description of the Forward Path Multi-media Management System architecture and show the essential building blocks of the overall system. One key element of this particular architecture is that the content sources are centrally located. FIG. 1C illustrates one physical network embodiment of the system of FIGS. 1A and 1B.

Content sources 105-107 are centrally located and typically sources of broadband multi-media programs that are either generated off-line or dynamically generated on-line. The content could be visual or visual/aural in its extent, or it could take some other form such as machine-to-machine data. This content is of interest to one or more grouped sets of end users (subscribers) on the forward path multicast.

End user devices that receive the content can be grouped by region, locale, or geography as sub-populations 160-163 where sub-population 163 is the Nth sub-population. In aggregate, all of the sub-populations form the "population" of end users. While not shown, these sub-populations could also be formed on the basis of end user attributes such as demographic, psychographic, or socio-graphic attributes; thus, the grouping may be logical and not physical. With this type of attribute matching, the grouping takes the form of a logical group versus a physical group and can be characterized also as a sub-population or population. The attribute grouping could also be paired with a physical grouping such that end users can be both logically and physically grouped to form a multicast sub-population.

The grouping process, be it geographic-, attribute-, or combinatorially-based, is accomplished via methods well understood in the art. To realize geographic grouping, the GPS position can be mapped to a given radii, and all end users within that radii are grouped. For attribute grouping, the end user or subscriber attributes are stored in a database such as a Home Location Register (HLR) if the wireless network is cellular; then all end users with the requisite attributes are logically joined as a group independent of their physical location. Alternatively, both "grouping" methods, geographic and logical attribute, are combined to provide highly targeted delivery, both by location and by needs. Other grouping methodologies are possible, and nothing herein limits how groups are formed. The groups that are defined are used by content routing and formatting element 149 shown on FIG. 1B to activate the network to deliver a particular stream of content to the grouped end user devices and in a format that matches their particular display and function characteristics.

Forward Path Multi-Media Management System 118 has three building blocks: Virtual Feedback Aggregator 120 acts as a communication device and buffer to collect and aggregate all of the reverse path information; Content Processor 130 acts as an information processor where software applications reside and process various inputs from the connected end user devices; and Content Integrator 140 performs the functionality of modifying the selected multi-media content stream. The modification by Content Integrator 140 could be a video frame processor, it could be an audio stream modifier, or it could be both, for example.

Content Processor 130 has algorithms to determine how N reverse path modifier inputs should be collectively assimilated and then sent to Content Integrator 140 for content modification. Content Processor 130 determines how to apply the collective inputs for a given processing step performed in Content Integrator 140. There is at least one resident software application, and there could be multiple software applications concurrently operating. The inputs include, but are not limited to: what region an end user device is in (useful for forming the forward path multicast region); what sensor data the device is sending, such as HazMat information; what the GPS location is of a given device; is there a "user input" such as an action or motion for a gaming application; and so on.

Reverse path 170 originating in FIG. 1B and connected to Forward Path Multi-Media Management System 118 and internally to Virtual Feedback Aggregator 120 provides a method where end user devices in groupings 160, 161, 162, and 163 communicate data for the modification procedure that ultimately occurs at Content Integrator 140. This completes a continuous processing cycle end-to-end across the Forward Path Multi-Media Management System 118.

The Forward Path Multi-Media Management System 118 enables the functions of aggregation of reverse path content at Virtual Feedback Aggregator 120. The reverse path content conveyed from content sources 105-108 is comprised of content that is multi-media in nature, where the content sources 105-108 are uploading raw content to the Content Integrator 140 of the Forward Path Multi-media Management System 118.

It is anticipated that the preferred embodiment has a feedback loop comprising reverse path 170 as the content modification data link; and paths 110, 111, 112, and 113 are used primarily for content source paths. In addition, the forward path components 110A-113A, where links 110-114 are bidirectional links, are shown as directly connected to the content sources 105-108 to illustrate how the forward path multi-media content can be modified directly at the content generating content sources 105-108. In this architecture, the content sources 105-108 embody a content processing capability similar to the Forward Path Multi-Media Management System 118.

At Content Integrator 140, the processing steps for a gaming application are different than the processing steps for a HazMat event, for example. Content Integrator 140 can have a number of applications, and the listed applications in no manner suggest that this is the entire set of applications that the Forward Path Multi-Media Management System is capable of implementing. In addition, the applications illustrated herein can be implemented as an integral part of the Forward Path Multi-Media Management System 118, or can be sites that are located external to the Forward Path Multi-Media Management System 118. These external sites can be existing content generating and processing systems, such as a massively multiplayer role-playing game (MMORPG) which enables players located at diverse locations to form subgroups, tribes, or armies within the game space.

The applications illustrated in the Forward Path Multi-Media Management System 118 are for illustration, and multi-player application 141 is a gaming process that implements multi-player gaming or live multi-party interactive competitions. Morphing Area process 142 uses the received reverse path feedback data to map a geographical locus and region of a physical phenomenon that is detected by a plurality of the end user devices, such as the presence of a BioHazard. Education application 143 represents an education application where a student or students can ask professors questions of a live multicasted classroom lecture. Personal Medicine application 144 is a multi-party medical feature, such as a support group for cancer. Traffic reporting application 145 uses the feedback received from the end user devices to map road conditions on the various highways that are being traversed by the end users. Blogging application 146 provides the end users with a venue to post blogs. Personal video upload service 147 enables the end users to upload multimedia files for sharing among end users. Social networking application 148 represents any multi-party communication site.

The output of these various services and applications are transmitted to content routing and formatting element 149 for display formatting and routing to end user groups. These outputs are then transmitted via communication path 150 to effect a multicast of the modified content which is transmitted to the end user devices via the forward path 155 of the communication network. Note that forward path 155 can take on many forms, ranging from cellular to MediaFLO to WiMax, and this listing does not limit the inclusion of other means which realizes a simultaneous forward path delivery mode. Forward path 155 connects to end user groupings 160, 161, 163 and to end-user device 162. As an example, grouping 160 contains end user devices 1, 2, 57 which are unique to Region 1; the forward path to this grouping could be via MediaFLO, for example. In grouping 161, Region N's end user devices 2-10 and 15, 18, 105 might be connected via forward path 155 as a WiFi architecture. In Region 2, the listed end user devices could be connected via forward path 155 as a DVB-H signal. The Single Device 162 may be in a very remote area, so it uses a mobile satellite to receive forward path 155.

Cellular Network Implementation

FIG. 1C illustrates one embodiment of a physical implementation of the system of FIGS. 1A and 1B. In FIG. 1C, a cellular network is depicted, but other network architectures are capable of realizing Forward Path Multi-Media Management System functionality. Other network types include: MediaFLO, WiFi, WiMax, satellite, Bluetooth, UWB, and so on. Of note, certain cellular building blocks are not shown for concept clarity; the devices not shown include but are not limited to: Home Location Register (HLR), Visitor Location Register (VLR), Mobile Switching Center (MSC), Packet Data Switch Network (PDSN), and so on. The function and interconnection of these devices is well known in the art.

Radio Network Sub-System 182 and Radio Network Sub-System 183 are shown, and these Radio Network Sub-Systems could be CDMA or TDMA for their RF access protocol; they could be 3 G or 3.5 G in their deployment lifecycle. The frequencies could be 800 MHz or 2 GHz. Each Radio Network Sub-System serves a unique geographic region. Cell site 198 serves end user devices 189 through 190, and cell site 199 serves end user devices 194 through 195.

Cell site 198 could be omni-directional in its coverage extent, while cell site 199 could be sectorized in its coverage. Further, end user devices 189-190 are grouped together because they are receiving a common multicast from Radio Network Sub-System 182 via cell site 198 along RF forward path 186. Likewise, end user devices 194-195 are receiving a common multicast from sectorized cell site 199 via RF forward path 191. However, on the reverse RF path, end user device 189 communicates via RF pathway 187, while end user device 190 communicates on the reverse path via RF pathway 188; and end user device 194 communicates on reverse path 192, while end user device 195 communicates via reverse path 191.

In a process well understood in the art, a mobile device (end user device) could move from sectorized cell site 199 to omni-directional cell site 198 and retain seamless coverage via the handoff or handover process. Handoffs can be hard, meaning the previous signal is dropped before the new signal is acquired, or they can be soft, where both cell sites 198 and 199 would have communication for a period of time until the handoff is completed. Separately, within the sectored cell site 199, a "softer" handoff process can occur wherein the end user device operates on two adjacent coverage sectors of cell site 199 at the same time.

To initiate a forward path modification sequence, a content modification signal is sent across the physical network. Tracing the path of one example reverse path signal, end user device 189 would communicate via reverse path 187 to cell site 198, which then communicates with Radio Network Sub-System 182. End user device 182 then communicates with data switch/router 180 to the network 181. Network 181 contains all the typical networking formats to include Public Telephone Switched Network (PSTN), Public Switched Data Network (PSDN), and an Internet Protocol Network (IP Network). In addition, while not shown, other protocols that are more suited to a mobile architecture, such as IPv6, may be deployed.

The network 181 is connected to end user devices 184 and 185 via a more traditional wired paradigm. Forward Path Multi-Media Management System 175 is connected to network 181, Forward Path Multi-Media Management System 175 receives reverse path modification information from all the then connected end user devices, and processes the data in a manner described herein. The Source Content site 177 delivers content to Forward Path Multi-Media Management System 175; content can be multi-media or any other data form that has relevance to the subscriber population or subpopulation. After the Forward Path Multi-Media Management System has performed its operations, it forwards the modified forward path content back to network 181. Network 181 then communicates to router 180, then radio network subsystem 182 and cell site 198 finally transmit the modified forward path content via RF path 186 to end user devices 189-190, respectively. This process repeats in a cyclical fashion, starting with reverse path modification information to the Forward Path Multi-Media Management System 175, which then modifies the forward path content on a frame-by-frame basis if video, and then back to the end user devices.

Gaming Representative Architecture

Figure 2:
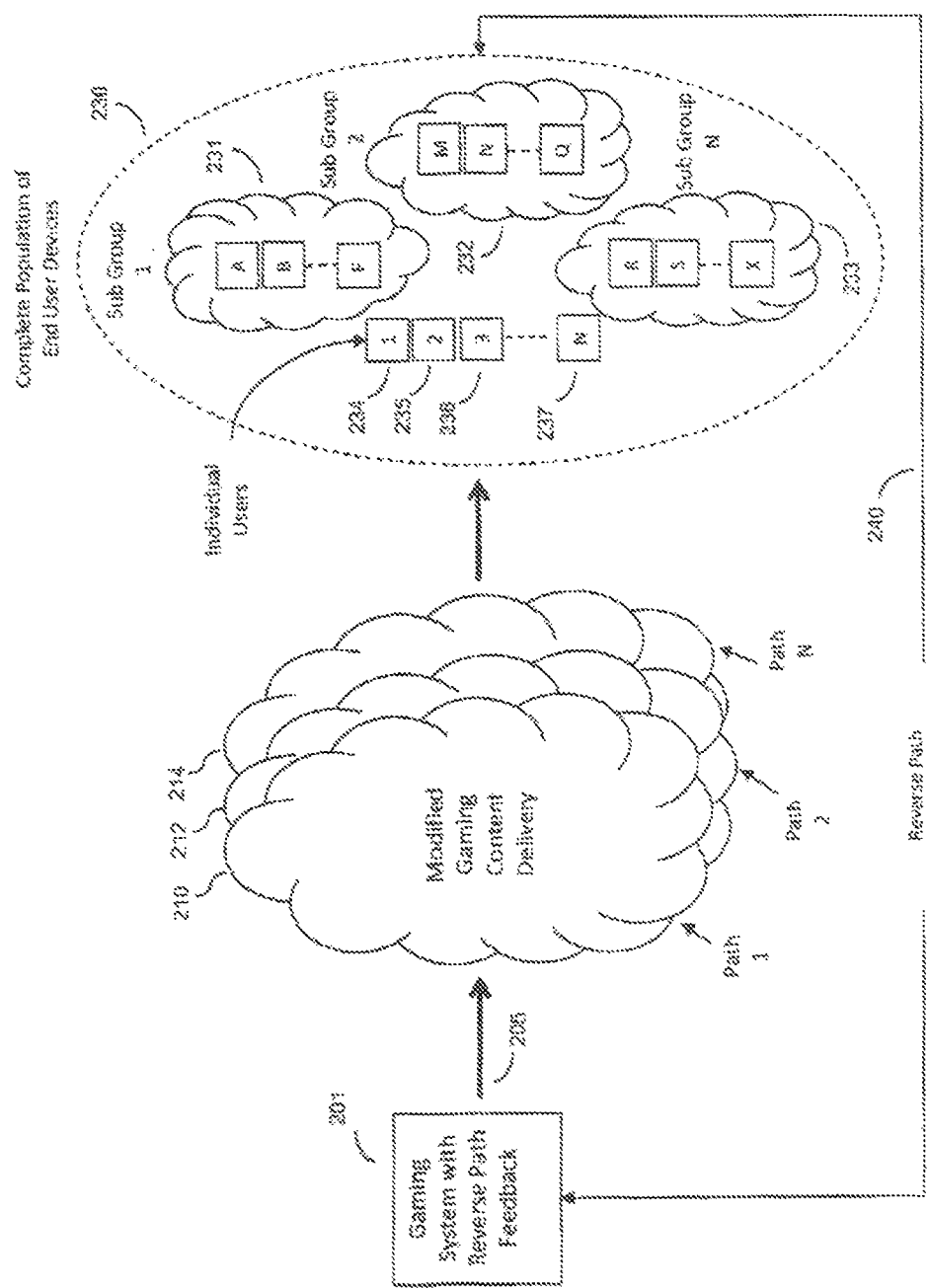
FIG. 2 illustrates the interrelationship between a series of forward path multicasts and sub-populations of end users with reverse path feedback.

FIG. 2 illustrates, in broad perspective macro block diagram form, how a typical gaming application might be architected. For this description, the card game of blackjack gambling is used; however, nothing in this example description limits the applicability of the described concepts to other applications with similar attributes.

At Forward Path Multi-Media Management System 201, the reverse path feedback data is aggregated from reverse path 240. The data coming into Forward Path Multi-Media Management System 201 originates from end user devices located on the right side of FIG. 2, shown as squares with alpha or number designators (to be discussed more later in this section). This feedback data could be instructions such as: "I'll take another card" or "I want to double down" or "I fold and am out for this game only" or "I am done playing entirely". For blackjack, the "dealer" is a software application residing as an external network connected device 202, called Application. This software application 202 responds to the feedback data collected by Forward Path Multi-Media Management System 201 and then creates and provides modified content via connection 205 to forward paths 210, 212, and 214. Likewise, any other application, be it multi-player gaming or the like, would operate in a similar fashion.

Nothing herein limits what form forward paths 1, 2, and N, respectively 210, 212, and 214, take. Thus, forward path 210 could be WiFi, forward path 212 could be MediaFLO, and forward path 214 could be cellular, each of which comprise an air interface for the forward path. Forward paths 210, 212, and 214 can also be characterized as a physical delivery region, or could be characterized as a combined physical and logical delivery region/method, respectively, or just a logical delivery method. If forward paths 210, 212, and 214 are logical delivery paths, then the delivery methodology is related to pairing of end users with a given forward path's content, where the end users have like interests independent of physical location. The actual physical delivery regions of these forward paths could be highly varied and diverse. For example, forward path 210 may just be a single narrowcast to a neighborhood in a city on a Caribbean island where electronic gambling is legal. In contrast, forward path 212 could be to all the major gambling areas in the world to include, but not be limited to: Las Vegas, Atlantic City, river boats on the Mississippi, cruise ships on the ocean, casinos on tribal lands, the French Riviera, Monaco, and so on. For forward path 212, since it is covering so many diverse geographic regions, the air interface of the forward path, be it WiFi, DVB-H, or MediaFLO, can vary; and nothing herein limits what method is used to deliver the reverse path modified content on the forward path. Finally, forward path 214 might be to all college campuses in the state of Nevada that have more than 2000 students.

The modified forward path content is sent via connection 220 which, as already discussed, could take the form of a variety of wireless air interfaces. The Population 230 comprises the complete set of then connected Players or End Users and their associated End User Devices. Within this Population 230 of the then connected end user devices, Sub-Populations 231-233 are present. These Sub-Populations 231-233 may be geographically concentrated to enable an efficient forward path multicast, narrowcast, or broadcast delivery; or these Sub-Populations 231-233 may be defined as the set of all Players or End users that are blackjack aficionados (i.e., a logical grouping). Again, this latter description is more logical in its extent. Thus, Sub-Populations 231-233 may be logically based on demographics, for example, physically based on location, or the Sub-Populations 231-233 could be a combination of each "grouping methodology". For instance, in Sub-Population 231, end user devices A and B may be in the same geographic region as end user devices M and N in Sub-Population 232, and so a single physical air interface narrowcast (WiMax, for example), is set up to deliver the modified forward path content to end user devices A, B, M, and N, since they are geographically close or in some air interface proximity to each other and within the coverage region of the WiMax cell.

Alternatively, Sub-Populations 231-233 could all be geographically defined, and the logical grouping of those end users interested in blackjack has already been defined by the system. In this case, three multicasts would be set up to deliver modified forward path content to these three geographic regions. Individual Users having end user devices 234, 235, 236, and 237, the Nth device, would each have their own physical air interface connection to the modified forward path content.

In aggregate, the entire Set or Population 230, in some pre-specified timeframe, provides feedback via reverse path 240 to Gaming System with Reverse Path Feedback 201, all in a continuous fashion until a given blackjack game is complete, when a new game is started, or when the scheduled time for blackjack is over, for example.

More on Logical Architectures

Figure 3:
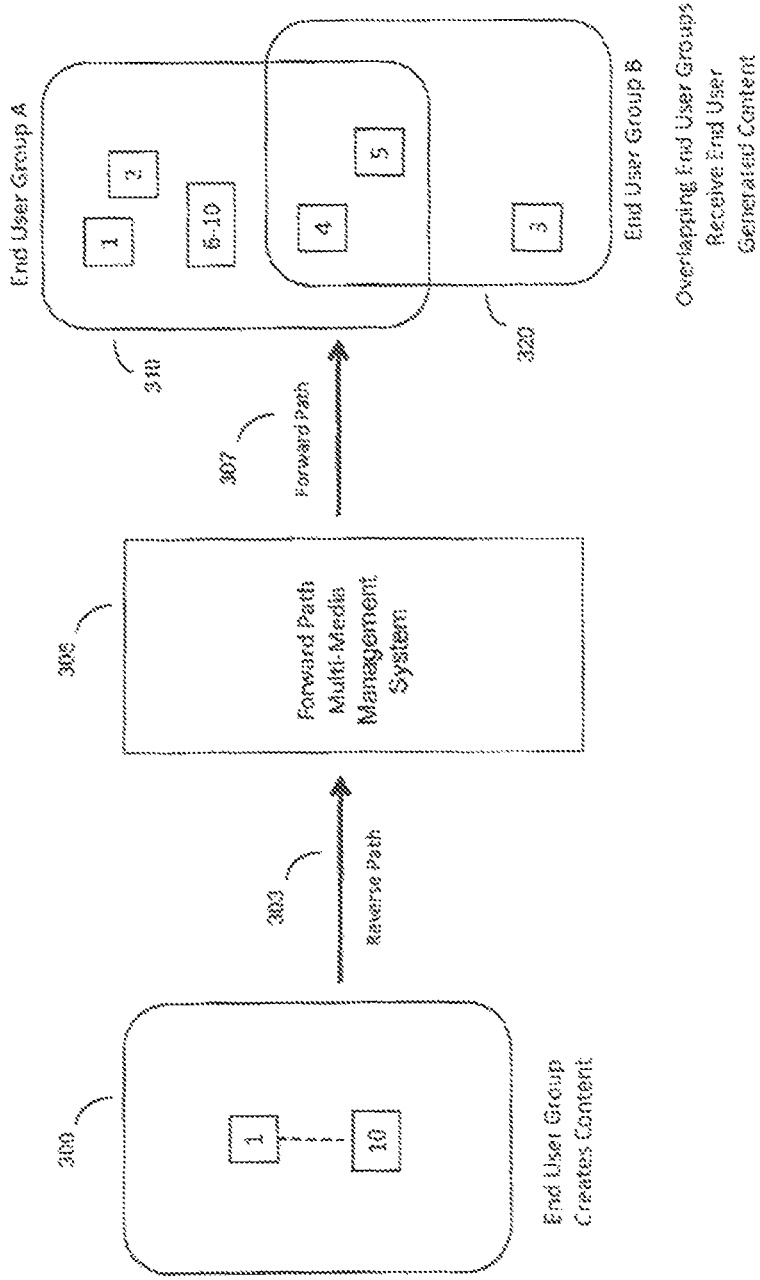
FIG. 3 illustrates, in block diagram form, overlapping user groups.

In FIG. 3, content sources 1-10 individually and in aggregate create content which is supplied to the network. Content sources 1-10 then are connected via conductors 303, which could be wired or wireless in its extent, to Forward Path Multi-Media Management System 305. Forward Path Multi-Media Management System 305 aggregates the content from content sources 1-10, as applicable, and then applies this data to the Application, for this example residing within Forward Path Multi-Media Management System 305. The Application at Forward Path Multi-Media Management System 305 then provides input to modify the streamed forward path content to update the end user devices in a continuous fashion, via wireless forward path 307, as a preferred embodiment already described herein. The delivery of the modified forward path content is sent to, in this example, sub-populations 310 and 320. These sub-populations in this particular example are geographic in their extent; that is, the end user devices are within the geographic region of a common shared forward path. Thus, in this embodiment, the chain of communication and content conveyance initially derives from end users that are logically grouped to end users that are now geographically grouped. While the description heretofore has described a logical to physical grouping, there is nothing herein that limits other types of grouping pairs such as: logical to logical groupings, physical to physical groupings, or physical to logical groupings.

At the content source origination point 300, with central content sources 1-10, the conveyed content the is collectively aggregated and processed at Forward Path Multi-Media Management System 305 according to the application residing at Forward Path Multi-Media Management System 305, and then delivered back to these same end user devices, wherein the forward path 307 content has been modified based on end user input(s). Thus, at delivery region 310, in this example, end user devices 1, 2, and 6-10 are all physically proximate within a given multicast, narrowcast, or broadcast region of the given forward path 307 for that geographic region and share a common air interface or channel which coveys modified forward path content to the end user devices. Likewise, in delivery region 320, end user device 3 is wholly and uniquely served by forward path multicast delivery region 320. However, end user devices 4-5 can receive the modified forward path from either delivery region 310 or 320. More importantly, it may not be an either/or reception decision from the end users perspective, that is to select just delivery region 310 or just delivery region 320. In fact, the reception could be in soft or softer handoff, wherein wirelessly conveyed information is received and combined in a known fashion from both delivery regions 310 and 320 (this is typically a CDMA architecture which more easily enables the best path selection of N&M paths on a bit-by-bit basis and outputs a more error free data stream than if just N or M were singly selected).

In FIG. 4, a second set of content sources 420 is added; however, nothing herein limits the number of User Groups supplying forward path modification information (via the reverse path). Content source group 1 has content sources 10-15. Content source group 2, in a similar fashion, has content sources 32-39. In aggregate, content sources 10-15 and 32-39 create and communicate content via reverse paths 415 and 425, respectively. The form of the conveyed reverse path data could be original pictures, video, and/or music created by the end user or end user devices; or it could be forward path modification data such as in a gaming, gambling, or hazmat application. Thus, there is nothing that limits what is conveyed on the two reverse paths 415 and 425. Reverse paths 415 and 425 could themselves be shared in some air interface, such as in the time domain or code domain, where a given frequency allocation is fixed; the sharing could be multi-frequency such as in frequency hopped spread spectrum; or the reverse path could be of the wired form, or a combination of wired and wireless. The reverse path may be unique to some or all the end user devices, such as in a circuit switched connection. Last, the reverse path could be packet switched in nature. Thus, the access method (TDMA, CDMA, and the like) the modulation (PSK, QAM, and the like) the frequency, or wired vs. wireless is not a limitation of this invention. Generic reverse paths 415 and 425 connect to the Forward Path Multi-Media Management System 430.

Forward paths 440, 441, and 442, in this example, are all shared and are wireless in nature. The wireless forward paths are architecture, modulation, access, and frequency independent. Thus, forward paths 440, 441, and 442 could all be the same architecture, or they could be different architectures; the selected architecture or architectures for forward paths 440, 441, and 442 may be geographically static or they could move or morph as the population or sub-population of end users or end user devices moves. These forward paths could be WiFi, WiMax, MediaFLO, DVB-H, cellular, satellite, Sirius Radio, XM Radio, or some other type of architecture that enables sharing of the forward path to given groupings of end users. In this example, the content sources previously discussed, 10-15 and 32-39, are formed into two logical groupings comprising three forward path physical delivery regions. End User Group D is receiving one content stream via forward paths 440 and 441. End User Group C is receiving content via forward paths 441 and 442.

In End User Group D, end user devices 32 and 39, along with end user devices 10-12 and end user device 38, are all receiving the same multicasted content via forward paths 440 and 441, respectively. That is, shared forward path 440 serves end users 32 and 39, while shared forward path 441 serves end users 10-12 and end user 38, each path conveying like content to these end users.

Shared forward path 441 is also used to convey a second set of content to End User Group C. In this example, end users 10-12 and end user 38 are receiving two sets of forward path content via forward path 441, one set for End User Group D and the other set for End User Group C. Thus, it is possible to have overlapping forward path logical delivery regions by logical addressing of delivery where a given shared forward path is conveying different sets of content over the same air interface to a shared physical delivery region.

End user devices 13-15 and 33-37 are served via shared forward path 442 via a wireless means. While the preferred forward path is wireless, since it can be shared, thereby increasing network efficiency and minimizing delivery cost, it is possible to have forward path 442 be a wired Internet Protocol (IP) where a packet switched architecture conveys the content to the end user devices via a more traditional wired means (where wired could be copper cable, DSL, cable modem, fiber optic, or other such means).

HazMat Event

In FIGS. 5A and 5B, the utility of the Forward Path Multi-Media Management System is used to efficiently, and in real time or near-real-time, deliver updated information concerning a HazMat event, both to emergency responders as well as to the general population. FIG. 5A is at Time=X, and FIG. 5B is at Time=X+delta. Thus, FIG. 5B is after FIG. 5A in time sequence.

In this example, a train has derailed in a city and the tanker cars are leaking chlorine gas. Fixed location chemical hazard sensors, as well as mobile sensors, can report the strength of the chlorine gas plume as it is moved and redirected by the wind. These sensors in aggregate periodically report the strength of the plume at a given time back to the Forward Path Multi-Media Management System, which then maps the plume and serves this map via a shared wireless forward path or a wired forward path to emergency responders, as well as local and regional citizen populations.

The very concept of integrating chemical hazard sensors (to include bio-hazard sensors or radiation sensors) into personal communication devices that are part of a Forward Path Multi-Media Management System architecture is wholly novel. Since nearly everyone has at least one personal communication device, be it a cell phone, laptop computer, or the like, the density of sensors integrated into cell phones in any given region offers the unprecedented opportunity for high granularity in the detection and reporting of a HazMat event. Equally important, as the HazMat event changes or morphs, in this example due to wind, this large population of reporting devices maintains a continuous feedback loop of plume strength versus location (since the devices have GPS or other location identification means) which enables the Forward Path Multi-Media Management System to aggregate all of these reports, then map the plume, and finally, in a continuous or repetitive fashion, deliver these updates back to the emergency responders or citizenry population. The system can suggest evacuation methods and driving corridors, it can predict the next likely location of the plume, it can predict the next likely strength of the plume in a future location, and so on. It can advise citizens it may be safer to stay in their homes and to close all the windows. Interagency emergency responder communications are now enhanced and uniform—all receive the same information. Active tactical management of the HazMat event is now possible in a manner heretofore never possible.

In FIG. 5A, the HazMat event 520 covers or partially covers communication cells 503, 504, 505, and 507, which are a sub-set of communication region 100. To keep this example easier to describe, only one end user device has been placed in each communication cell. In reality, there would be large numbers of end user devices in a given cell, the very number of devices enabling highly accurate reporting of the location of the plume at any given moment. Each end user device, whether fixed in location, mobile, deployed by ground teams, or deployed by aerial means, would contain in block form an end user device coupled to a chemical sensor, in this case. End user devices 3, 7, and 1 are in the chlorine plume and report back the strength of the plume, the time, and physical location. The Forward Path Multi-Media Management System maps this data and then sends back a map of the plume to the entire communication region 100 in FIG. 5A, which contains other communication cells and end users that at Time=X are currently unaffected by the plume. Thus, communication cells 501, 502, and 506, while presently unaffected, would also receive a current map of the plume showing strength, size, and likely future plume location and strength. The devices in cells 501, 502, and 507, respectively 14, 2, and 4, would display the data so that emergency responders or citizens can respond accordingly.

In FIG. 5B, the time is now X plus Delta. The chlorine cloud plume has changed or morphed based on prevailing wind conditions. In addition, as shown in communication region 100, the end users and their respective locations have changed as well. In communication region 100, only end user 3 remains in the same physical location. End user 3 could be a fixed reporting station, an after-event deployed stationary device, or an abandoned device as the end user left the area in the evacuation.

The morphed plume now covers or partially covers communication cells 501, 502, 505, 507, and 506 and is shown as 521. Now, end user device 7 has moved from cell 504 to cell 507 and has remained within the plume's extent—this end user device could, for example, be that of an emergency responder who is a member of the medical aid team. End user device 6 in cell 506 was not in the region in FIG. 5A. This device could be carried by an emergency responder, such as a HazMat team response truck. End user 4 now in cell 502 could be a citizen trying to outrace the plume's travel since it moved from cell 507; sadly, they went the wrong direction since their end user device was inoperative in the forward path direction and they couldn't receive the updated plume direction projection.

The value of this system in public emergencies, terrorist attacks, public disasters, or even in a conflict region such as a war zone is quite clear. The telecom infrastructure doesn't become overloaded and fail; the end user devices form a highly distributed sensor network; and the delivery of timely information is then via shared forward path. Property damage is contained and, most important, injury and loss of life is greatly minimized. A terrorist-related event is better managed, whatever the form of attack; when 9-11 happened, communication facilities were completely overloaded. The forward path multicast can have multiple data streams, some for emergency medical responders, some for citizens, and others for HazMat personnel. The system bridges the communications gap between local, state, and federal authorities and provides a seamless network where all emergency response activities can be centrally coordinated for maximum effect.

Reverse Packet Timing

In FIG. 5C, for most applications, it is important to time align the reverse path packet set 510 comprising packet streams from end user devices 1 to N. This is true for a HazMat event where aggregated reverse path data must be time synchronized to some acceptable window of error. Without such synchronization, the data sent out via shared multicast forward path could be in incorrect and actually cause additional harm or loss of life. In other applications, such as gaming, the players' data needs to be aggregated, again within some time window: otherwise, the modified forward path content appears out of context or nonsensical.

At Reverse Path Packet Aggregator 520, a buffer 521 stores the packets until they can be time sequence ordered by content stream feedback aggregator 522 (within some time window) and then forwarded to the delivery networks by an application router 523. Reverse path packets that arrive outside of the time window for aggregation would be discarded.

Process for Modifying the Forward Path

Figure 6:
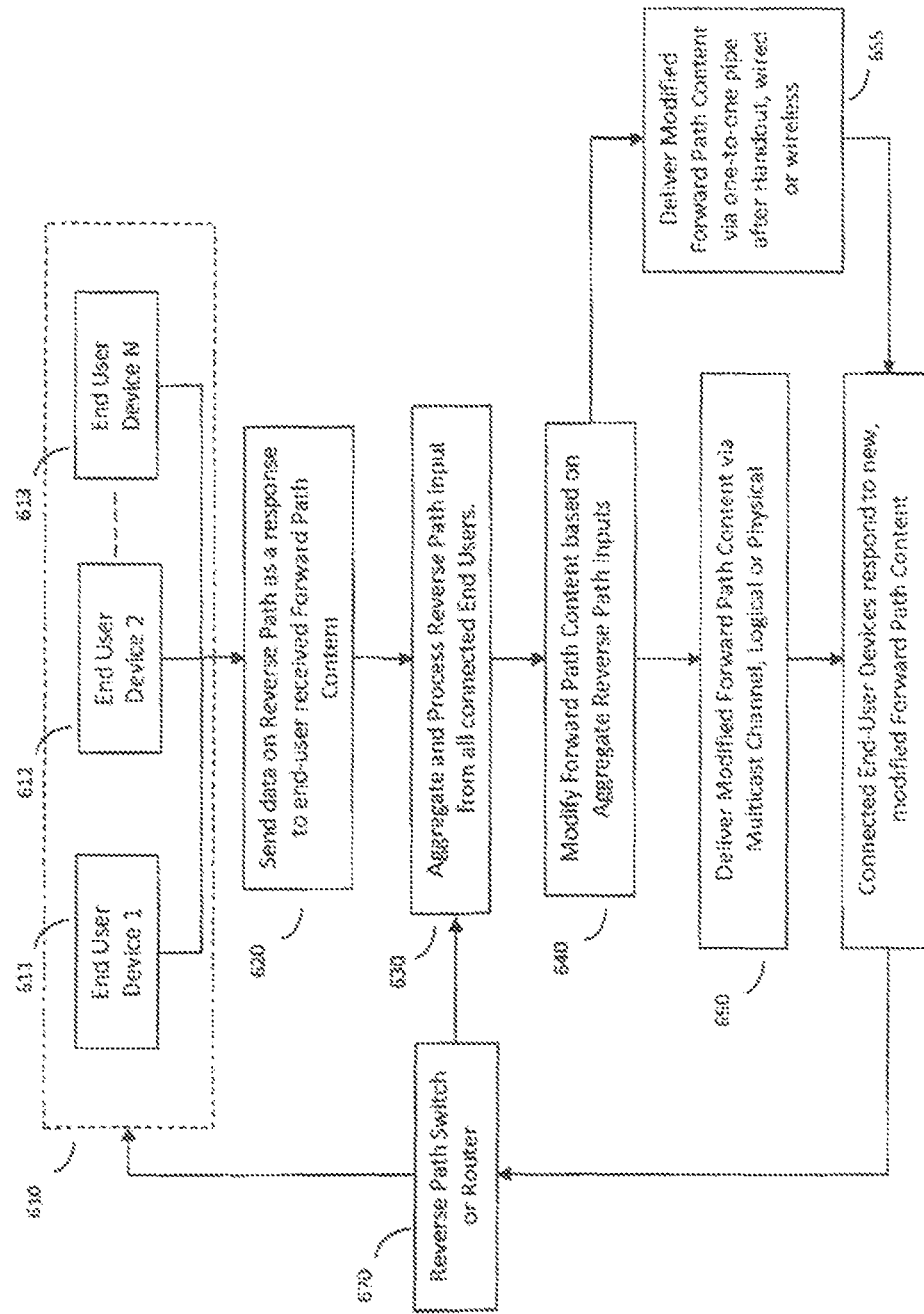
FIG. 6 illustrates, in flow diagram form, the macro process steps that the Forward Path Multi-Media Management System takes to complete a continuous forward path modification cycle.

In FIG. 6, a typical process for modifying the content that is transmitted on the forward path is described. This is merely one of a number of methods to modify the content that is transmitted on the forward path and is not meant to be the only means for such forward path modification.

At step 610, the entire population of then connected end user devices is shown. The Forward Path Multi-Media Management System is not limited to where the end user devices are physically located. End User Device 1 (611), along with End User Device 2 (612) and End User Device "N" (613), respond to the most recent forward path content, such as the display on a hand-held video game, and initiate a reverse path communication via their end user device at step 620, such as how to move their avatar in an action game. At step 630, the Forward Path Multi-Media Management System receives and processes the reverse path inputs from the then connected end user devices. Step 630 would also implement the steps of FIG. 5 to insure time coherency in the aggregated responses.

At step 640, the forward path content, still to be delivered back to the connected end user population, is modified. Thus, in this gaming application, the next frame (or number of frames) of the game is modified based on the collectively aggregated reverse path inputs. At step 650, the game video and audio is delivered via a shared forward path. The delivery can be via physical grouping, logical grouping, or a combination of the two forms of grouping. At step 655, the game video and audio is delivered via a one-to-one communication means, either wired or wireless.

At step 660, the feedback loop starts again where the end users via their end user devices begin to respond to the new video and audio being displayed on their end user devices. Step 660 connects to step 630 in a continuous fashion until the game is complete or some other decision for game termination is realized, such as a time or date. In addition, at step 670, the end user feedback can be destined for selected ones of the other players in the multi-player game so a player can team with other players in a personal end user device to end user device communication link over the bidirectional links.

Intra-Network Handovers

Figure 7:
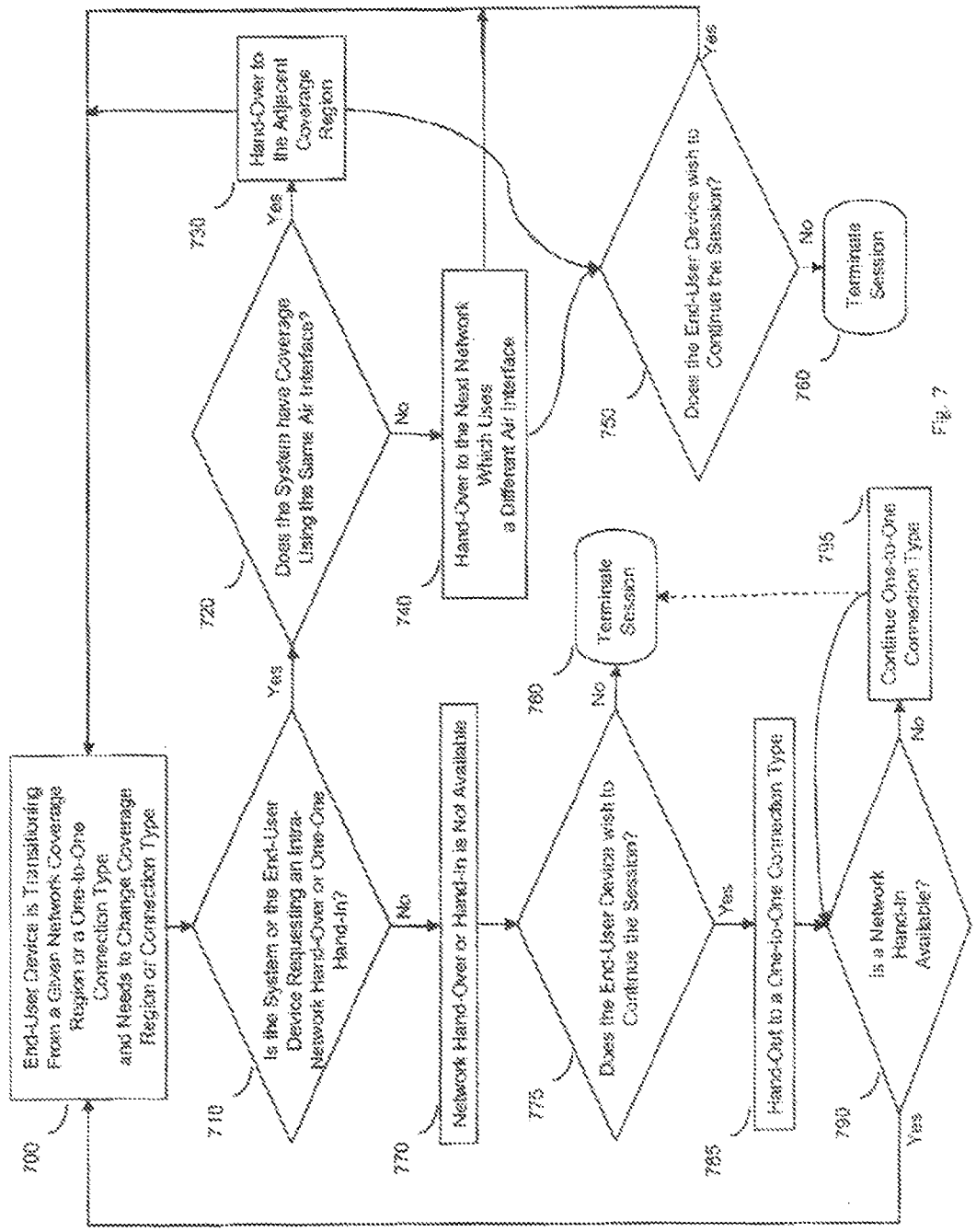
FIG. 7 illustrates, in flow diagram form, how an end user could hand-in or hand-out of a modified forward path multicast region.
Figure 8:
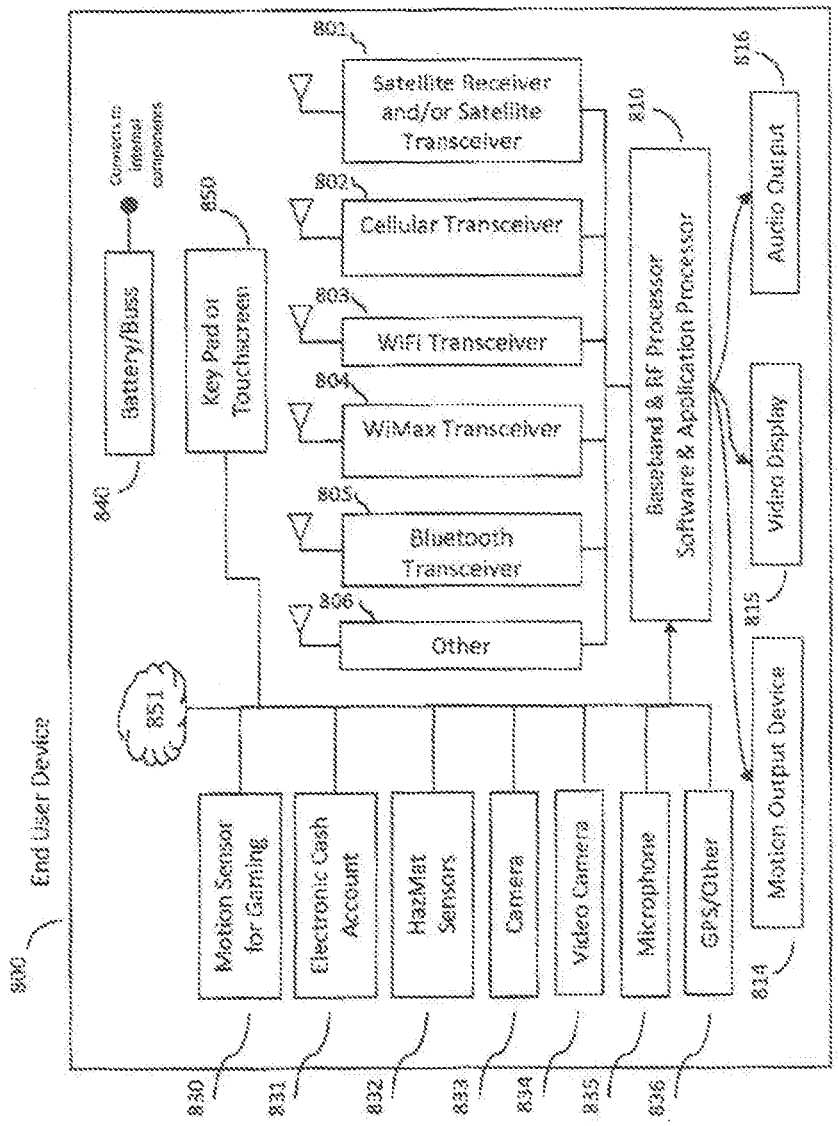
FIG. 8 illustrates, in block diagram form, a typical end user device.

FIG. 7 describes one method for managing intra-network handovers. The networks could be comprised of overlapping or adjacent multiple air interface architectures as shown in FIGS. 1, 2, and 8. Each of these architectures, whether it is MediaFLO, cellular, or satellite, has a shared forward path capability making it suitable for the Forward Path Multi-Media Management System. Often, it is desirable to find the fastest network, the least cost network, the most reliable network, the most available network, or some combination thereof, depending on the given application. In most locations, multiple network types are already deployed and readily available for Forward Path Multi-Media Management System use. As an example, a social network application could be advertising supported, but there is a bias or priority to least cost routing. In contrast, an emergency management system may have a priority of ultra-high availability and reliability. (Availability relates to network up-time, and modern networks often achieve 99.9% plus availability; reliability relates more to equipment failures. Reliability affects availability, although the two are not necessarily synonymous. For instance, a software failure affects availability even though the equipment hadn't failed.)

In FIG. 7, at step 700, an end user device is transitioning from a given network coverage region or a one-to-one connection type and needs to change coverage region or connection type. The following discussion first centers on an intra-network handover. At step 710, either the Forward Path Multi-Media Management System or the end user device itself recognizes that a hand-over is necessary. This is done through various means to include, but are not limited to: measurement of Radio Frequency signal strength, measurement of bit-error-rate (BER), measurement of frame-error-rate (FER), end user device measurements taken of an adjacent coverage region and then compared with the current coverage region, and so on. The Forward Path Multi-Media Management System, without end user device assistance, can direct a handover; the end user device can send a hand-over request to the system; or both the Forward Path Multi-Media Management System and the end user device can work together on some pre-determined algorithmic basis to request a handover.

Transitioning to step 720, it was determined that an intra-network handover was desired and was available. The word "intra" here means within the network; however, recall that the network could be multi-architecture as already described herein. Thus, at 720, a determination is made as to whether the end user device can handover to a new coverage region wherein said new coverage region is of the same air interface type. An example would be handing over from one MediaFLO coverage region to a second, adjacent MediaFLO coverage region. This is shown as step 730. This handover could be done in soft or softer handoff algorithms; it could even be a hard hand-off (make then break or break then make). The system, using well-known methods in the art, would insure that no data is lost during the transition, so the transition would appear seamless to the end user.

However, if an adjacent MediaFLO coverage region is not available, then a different air interface in the network must be determined and selected, again through bit-error-rate (BER), measurement of frame-error-rate (FER), or the like means. So, for discussion purposes, let's say that the preferred adjacent coverage region for this example is based on a WiMax architecture. In this case, the end user device would transition from the MediaFLO coverage region to the WiMax coverage region. This is shown as step 740. Specially designed timing and data buffers would insure that the data stream received at the end user device would be received in an error-free and seamless manner. The intra-network handover is error-free or lossless in its extent and is completed in an inter-manner between two different air interfaces, albeit both air interfaces being a part of the aggregate network.

In either example, MediaFLO to MediaFLO handover or MediaFLO to WiMax handover, the typical process is to continue the session to step 700 in a repetitive or continuous fashion. This enables end user devices that are mobile or moving in nature to have seamless coverage regardless of which air interface they select.

At step 750, the Forward Path Multi-Media Management System or the end user device itself can make the decision to terminate the Forward Path Multi-Media Management System session or continue the session back to step 700. If the decision is to terminate the session, step 760 is executed.

Hand-Outs/Hand-Ins from/to the Network

Going back to step 710, if a handover is requested but there is no physically adjacent network coverage of any air interface type (step 770), in order to maintain the Forward Path Multi-Media Management System session, the end user device must transition to a one-to-one connection type where the forward path is no longer shared but is unique to the end user device. The advantage of this approach is that the Forward Path Multi-Media Management System session remains seamless in its operation but it is no longer using a shared forward path. The disadvantage is that the cost of maintaining the session is now no longer shared among large numbers of end users. The one-to-one connection type could be circuit switched, packet switched, or use the IP protocol or IPv6 protocol, for example.

At step 775, the end user can manually elect at that moment in time or pre-select whether or not they wish to pay the extra cost for a one-to-one connection type. If they have elected that the additional cost is not desired, the end user device (if it's pre-programmed) can terminate the session at 780.

If the decision is to transition to a one-to-one type of connection, then step 785 is executed as a hand-out from the present multicast network using a shared forward path to a unique one-to-one forward path. It is important to mention again that the hand-out is seamless without loss of data using means well known in the art. The Forward Path Multi-Media Management System merely continues to send or stream whatever content that the end user was receiving as a shared forward path prior to the hand-out, only now it is a unique forward path. This unique forward path could be wired or wireless. For example, the end user drove out of a MediaFLO shared forward path coverage area and now transitions to a one-to-one cellular type of connection, which could be 3G because the application bandwidth is high.

In general, it is preferred to have the multicast forward path be shared for network efficiency and cost purposes. So, at step 790, the end user device is looking for a hand-in opportunity back to the multicast shared forward path architecture. Until the end user device determines that this is possible, the one-to-one connection continues in a repetitive fashion at step 795 unless the end user elects to terminate the session (shown as a dotted line between 795 and 780). If a network hand-in is possible, the process is returned to step 700.

Throughout all of the handover processes, the Forward Path Multi-Media Management System continues to receive aggregated reverse path content from the then connected end users with their associated end user devices. If the application running on the Forward Path Multi-Media Management System is a gaming application, for example, the shared forward path content remains being modified in a continuous fashion. If the end user device is connected in a one-to-one fashion, it would receive the same streamed content as those end users still using the shared forward path.

End User Device

FIG. 8 depicts a block diagram of one embodiment of an end user device. This particular embodiment of end user device 800 has multiple means to communicate, as well as numerous means to provide input to ultimately modify the forward path. The description of this device is likely more encompassing than would be for a typical end user device. The description contained herein is meant to show what is possible.

End user device 800 is capable of receiving content multi-casts, broadcasts, or narrowcasts on the forward path. End user device 800, either in an autonomous mode or via end user action, then is capable of communicating, in the reverse path direction, end user initiated content which could be complete in its nature; or it could be used (in aggregate) to modify the next few frames of a video game, for instance, after processing by the Forward Path Multi-Media Management System.

The central portion of end user device 800 is baseband and RF processor 810 which also contains an application processor with associated software/firmware. Baseband and RF processor 810 manages the operation of end user device 800 by collecting inputs from input devices 830-835 and 850, communicating via devices 801 through 806, and outputting content, information, and data via devices 814-816. Baseband and RF processor 810 contains typical elements, such as a microprocessor with associated memory and firmware, as well as loadable software. Input devices 830-835 are internally connected to relevant internal components via internal local network 851. They communicate directly with baseband and RF processor 810.

Device 830 is a motion sensor which could be used for gaming. This device has sensors for acceleration and/or motion; the data collected could be relative or absolute. Device 831 is an electronic cash account which provides for a secure means to store cash or cash equivalents on end user device 800 to include a means to send or receive cash or cash equivalents. The electronic cash account could be used to pay for accessing forward path modified content. This sub-device could also be an electronic credit card or some other electronic payment means like PayPal™.

Device 833 is a digital camera. Device 834 is a digital video camera. Device 835 is a microphone for audio input. Again, as previously described, all of the input sub-devices 830-835 are internally connected within end user device 800 via local network 851; sub-devices 830-835 also receive power and other signaling via 840, battery/buss. Device 850 is a keypad or touch-screen. This is an input device connected to internal network 851. Communication devices 801-806 are generally wireless in nature, but communication device 806 could be wired. As previously discussed, most end user devices would not have this many methods to communicate; rather, the end user device would have a subset of the means listed herein.

Device 801 is typically a satellite receiver for a data service from a high powered satellite such as Sirius Radio or XM Radio. It could also be future satellites such as those from Mobile Satellite Ventures (MSV). The advantage of satellite signals is that they can cover a very large geographic area for conveying the modified forward path. For Mobile Satellite Ventures, their architecture intends to use spot beams, albeit still covering a relatively large geographic area. Device 801 could also be a bi-directional satellite transceiver, meaning it could also transmit as well as receive from satellites.

Device 802 is a cellular transceiver. It could be multi-frequency mode, multi-access mode (GSM and CDMA), or it could be multi-air interface protocol, such as 1×RTT and EVDO. Device 803 is a WiFi transceiver generally conforming to the "802" standards. Device 804 is a WiMax transceiver. WiMax networks are being deployed as of this filing and offer the advantage of wider area coverage (longer link distances) than does WiFi, which generally is considered and used for shorter distance communications. For either WiFi or WiMax, the communication is typically packet switched and uses versions of the IP protocol, albeit wirelessly. Device 805 is a very short range Bluerooth transceiver. Device 806 is some other communication means to include wired communications.

The output devices of end user device 800 are 814-816. Device 814 is a motion output device. This could be a shaker or something more sophisticated, such as that in the Wii™ video game controller. It is designed to provide physical, sensory feedback to the end user or end user device. Device 815 is a video display. The display is likely digital in nature and would provide a high resolution (a large number of pixels) image capable of displaying images, video, games, and the like. It is anticipated that end user device 800 could also communicate an image, video, or visual information via a short range means such as Bluetooth to a remote monitor or display. Device 816 is for audio output. It could be via speakers mounted on the end user device, via wired or wirelessly connected headphones, or via a Bluetooth connection to a remote sound system, for example.

Modified Multi-Media Content

Figure 9:
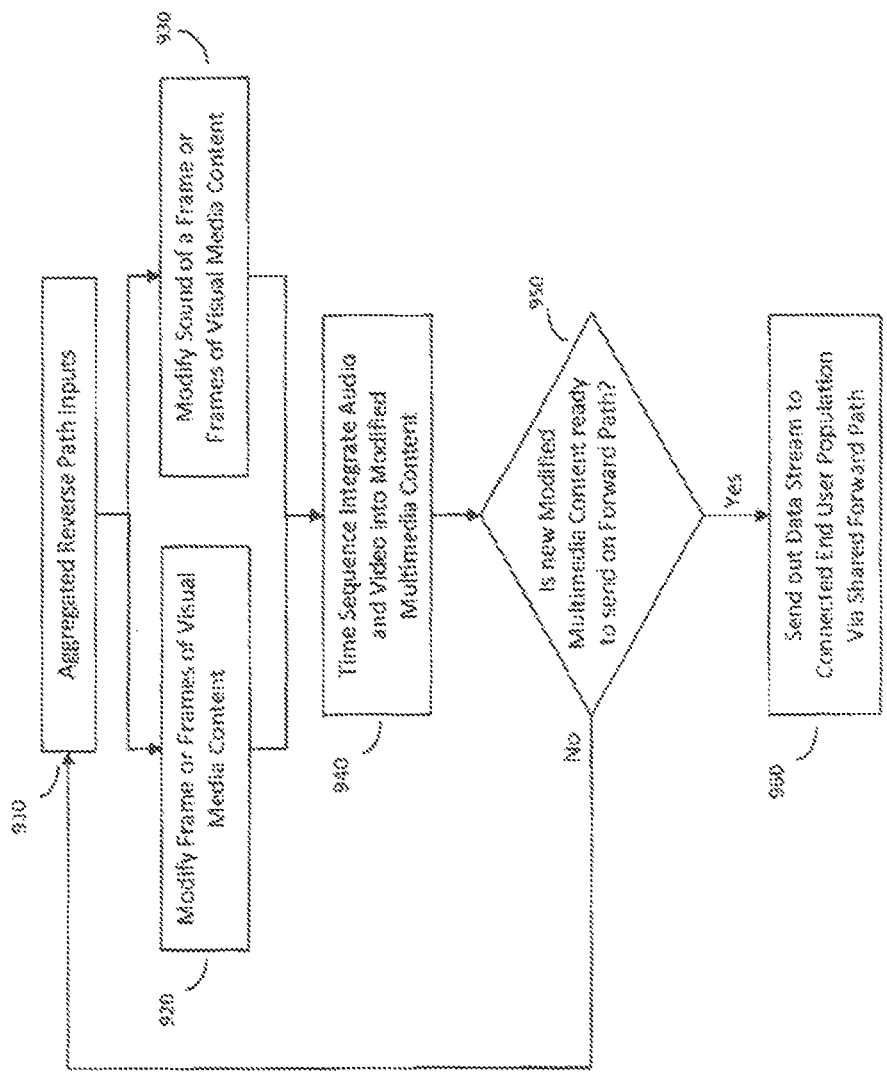
FIG. 9 illustrates, in flow diagram form, the process to modify forward path video and audio based on aggregated reverse path inputs.

FIG. 9 is a representative flowchart for modifying multi-media content. At step 910, the reverse path inputs from the then connected end users are aggregated in a fashion already described herein. At step 920, individual frames of the visual content are modified; and at step 930, the aural information is also modified. At step 940, in a time synchronous fashion, the visual and aural information is re-integrated. Step 950 determines if there is enough modified content to send via the forward path. If there is sufficient modified forward path data, at step 960, the modified content is sent via a shared forward path. However, at step 950, if sufficient frames are not ready to be sent, step 950 buffers the completed modified frames and then returns to the process flow back to step 910 to create more modified frames until such time as there are sufficient frames to send, application determinate.

Forward Path Multi-Media Management System Registration and Authentication

Registration and authentication for the Forward Path Multi-Media Management System is similar to other registration and authentication processes well known in the art. One key difference is that the Forward Path Multi-Media Management System may be operating across multiple different air interfaces in a given region, which is different than a sole cellular network or WiFi provider, for instance. In fact, the Forward Path Multi-Media Management System may be a contracted service to a variety of other service providers wherein the Forward Path Multi-Media Management System controls the modification and distribution of content, while other service providers operate the networks that are conveying the forward path modified content. It could also be true that the reverse path and the forward path do not belong to the same service provider. Thus, a centralized or regionalized Forward Path Multi-Media Management System registration and authentication system is desired.

Figure 10:
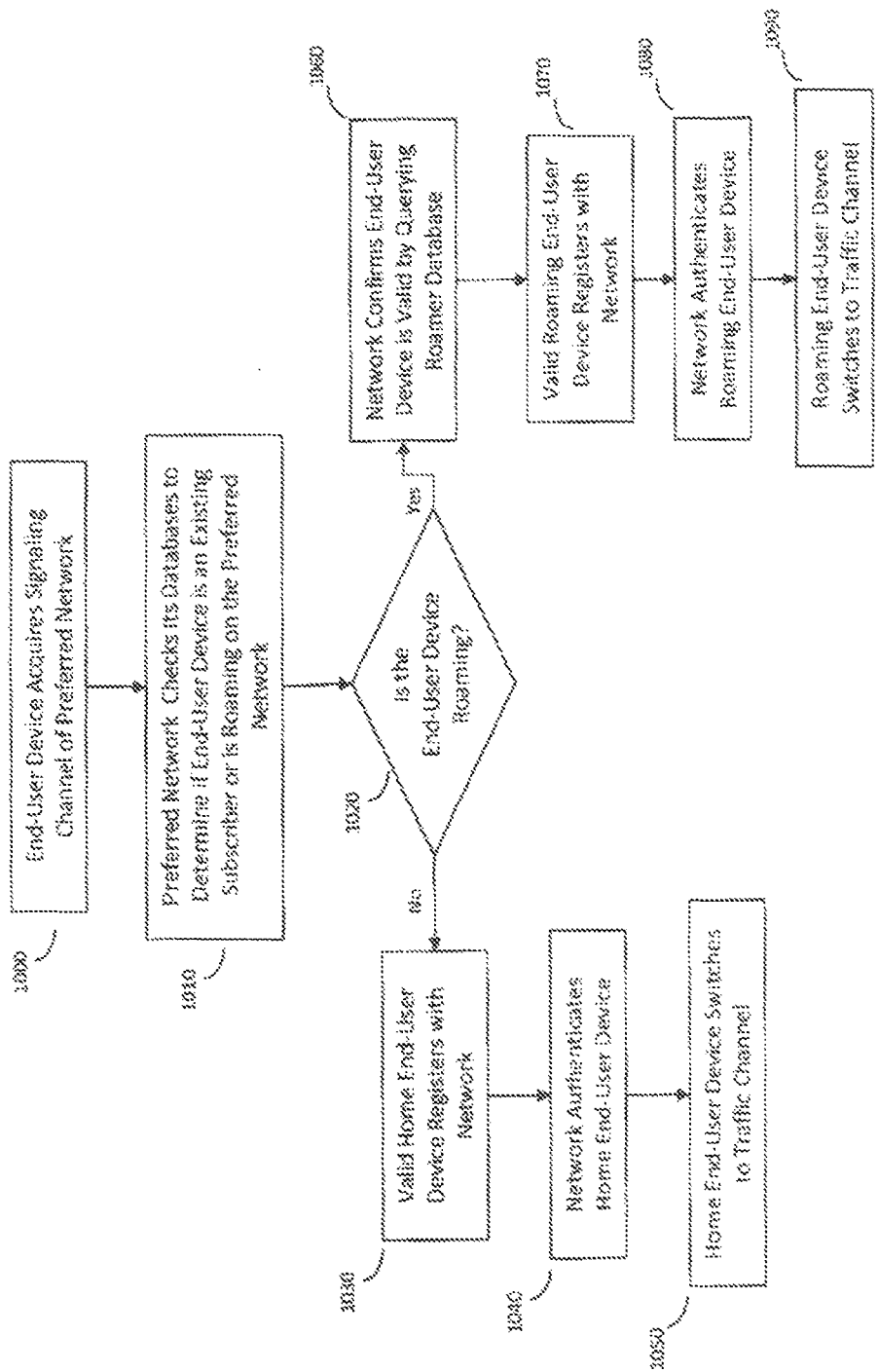
FIG. 10 illustrates, in flow diagram form, the registration and authentication of an end user device with the Forward Path Multi-Media Management System.

In FIG. 10 at step 1000, the end user device communicates with the then preferred network via that network's signaling channel. At steps 1010 and 1020, the then preferred network checks to see if the end user device is a home customer or a roaming customer. At step 1030, the customer was determined to be a home customer after a home database check, and the end user device registers with the then preferred network. To prevent fraud, the then preferred network authenticates the end user in a known fashion at step 1040. At step 1050, the end user is permitted access to the Forward Path Multi-Media Management System to include whatever content that customer is permitted access to via the traffic channel.

If the customer is a roamer, the Forward Path Multi-Media Management System checks the roamer database to confirm it is a valid device. Once confirmed to be valid, the end user device is registered at step 1070, authenticated at step 1080, and permitted access to allowed traffic channel(s) at step 1090.

Forward Path Multi-Media Management System Billing

Figure 11:
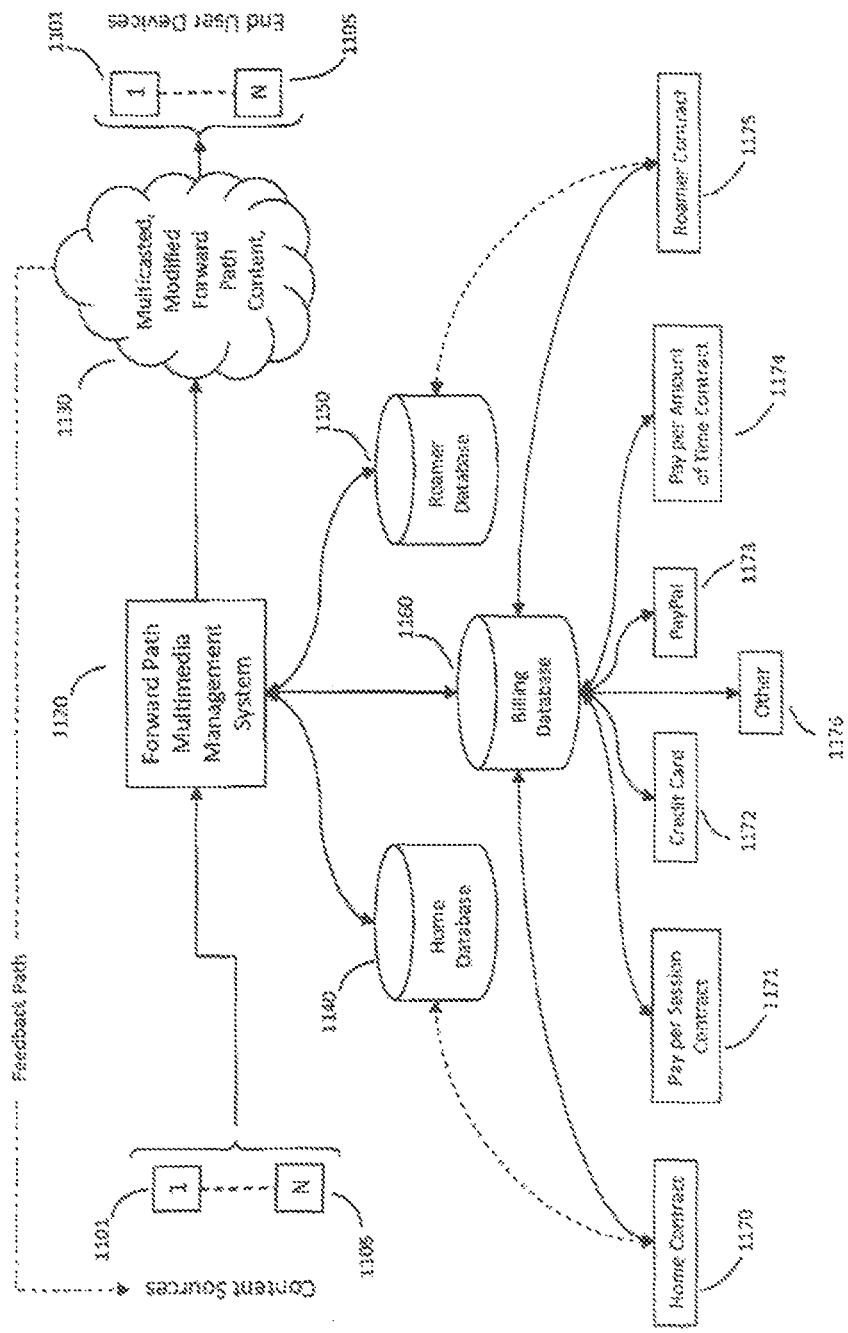
FIG. 11 illustrates, in flow diagram form, the billing process for the Forward Path Multi-Media Management System.

FIG. 11 describes a composite system block diagram that also shows one embodiment of the billing architecture. End user devices 1101-1105, where 1105 is the then connected Nth device, provide forward path modification information to Forward Path Multi-Media Management System 1110 via a reverse path connection. The Forward Path Multi-Media Management System collects all of the feedback from all of the then connected end user devices, in this case 1-N, and does this collection within some time window as already described herein. The Forward Path Multi-Media Management System also has hardware, software, firmware, and associated algorithms to modify the forward path content stream based on the aggregated reverse path feedback. After the forward path content is modified, it is delivered to the forward path communication channel, typically wireless, via network 1130. This content is multicasted back to the then connected set of end user devices, 1101-1105. The casting of the forward path enables simultaneous sharing of the content among all of the then connected end user devices which realizes orders of magnitudes in network operating efficiency.

Connected to the Forward Path Multi-Media Management System 1120 are three types of databases: the Home Database 1140, the Roamer Database 1150, and the Billing Database 1160. Devices 1140 and 1150 are integral to the steps described in FIG. 10, Registration and Authentication.

Billing Database 1160 is further connected to additional physical and/or logical devices which permit a variety of billing methods. The Home Contract 1170 would be similar to a typical cellular, WiFi, or internet service contract wherein the given month's Forward Path Multi-Media Management System activity would be billed once per month to the customer. The Home Contract 1170 has a dotted line connection to the Home Database 1140. Similarly, the Roamer Contract 1175 has a dotted line connection to the Roamer Database 1150. In cellular parlance, the Roamer Database often is called the Visitor Location Register (VLR), while the Home Database is often called the Home Location Register (HLR).

Other billing methods include: a Pay-Per-Session Contract 1171, which could be used for an application that had a known end time; a Credit Card 1172; a PayPal™ account 1173; a Pay-Per-Amount Of Time Contract 1174; or Other 1176. Each of these payment methods is not necessarily mutually exclusive and could be simultaneously present given a particular customer's preferences.

Summary

The Forward Path Multi-Media Management System architecture enables end user devices to share a common wireless forward path of a multicast communication architecture in which the forward path delivered content is dynamically changed or modified based on a real-time, near-real-time, or delay-time basis via aggregated reverse path feedback from at least one of a plurality of end user devices. The Forward Path Multi-Media Management System periodically or continuously aggregates the feedback inputs received via the reverse path (having wired and/or wireless connectivity), modifies the forward path multi-media content, and delivers this dynamically modified multi-media content to the then connected population of end user devices via a wireless forward path multicast, in a repetitive closed loop fashion.

The invention claimed is:

1. A Forward Path Multi-Media Management System, operational in a wireless communication network which serves a plurality of wireless end user devices comprising:
   a content distribution server, connected to a multi-casting wireless network that serves a plurality of wireless end user devices, for simultaneously transmitting a stream of content frames received from a content source to a group of wireless end user devices, comprising a set of selected ones of wireless end user devices, over a single unidirectional forward broadcast path of the multi-casting network that extends from the content distribution server to the selected wireless end user devices, wherein the stream of content frames comprise a series of frames that are delivered in sequence to the selected wireless end user devices and stored in a buffer, wherein past frames are frames delivered to the selected wireless end user devices and present frames are frames received by the content distribution server from the content source, stored in the buffer, but not yet delivered to the selected wireless end user devices;
   a private reverse path, concurrently operational with the unidirectional forward broadcast path, for transmitting end user input data which is responsive to receipt of past frames of the stream of content frames to dynamically modify at least one of the present frames of the stream of content frames stored in the buffer and to be transmitted to the selected ones of the wireless end user devices over the unidirectional forward broadcast path absent switching to other stream of content frames available on the unidirectional forward broadcast path;
   a feedback aggregator, responsive to receipt of the end user input data received from at least one of the selected wireless end user devices over their private reverse path, for accumulating the end user input data to dynamically modify at least one of the present frames of the stream of content frames stored in the buffer and to be transmitted; and
   a feedback integrator for generating a modified at least one present frame of the stream of content frames to be transmitted by modifying at least one of the present frames of the stream of content frames received from the content source based on the accumulated end user input data.

2. The Forward Path Multi-Media Management System of claim 1 further comprising:
   a content formatter for formatting the modified at least one present frame of the stream of content frames to be transmitted to a format consistent with a display of characteristics of the wireless end user devices, and
   a content router for transmitting the modified at least one present frame of the stream of content frames to be transmitted to the wireless communication network for transmission over the unidirectional forward broadcast path to the selected wireless end user devices.

3. The Forward Path Multi-Media Management System of claim 1 wherein the feedback aggregator comprises:
   a feedback synchronizer for associating the end user input data received from the end users with corresponding stream of content frames.

4. The Forward Path Multi-Media Management System of claim 3 wherein:
   the feedback aggregator further comprises:
      an updating processor for accumulating end user input data received from the end users for corresponding stream of content frames.

5. The Forward Path Multi-Media Management System of claim 4 wherein the feedback integrator further comprises:
   at least one content integration application, responsive to receipt of the accumulated end user input data, for revising said received content to produce revised stream of content frames.

6. The Forward Path Multi-Media Management System of claim 5 further comprising:
   a content feedback generator for transmitting end user input data, associated with corresponding stream of content frames, to a central content source that is generating the corresponding stream of content frames via a path that extends from the communication network to the central content source.

7. The Forward Path Multi-Media Management System of claim 6 further comprising:
   a content controller for transmitting data from a central content source, that is generating the corresponding stream of content frames, via a path that extends from the central content source to the wireless communication network to control operation of the content integration application.

8. The Forward Path Multi-Media Management System of claim 3 wherein:
   the feedback aggregator further comprises:
      a timing synchronizer for defining a time period for use by the feedback synchronizer during which time period the end user input data received from the end users is associated with at least one of the present frames of the stream of content frames stored in the buffer.

9. The Forward Path Multi-Media Management System of claim 8 wherein the feedback aggregator further comprises:
an accumulated feedback data processor for processing the accumulated end user input data received from the end users to a composite content revision for stream of content frames.

10. The Forward Path Multi-Media Management System of claim 9 wherein the feedback integrator further comprises:
at least one content integration application, responsive to receipt of the accumulated end user input data, for revising the received stream of content frames to produce revised stream of content frames.

11. The Forward Path Multi-Media Management System of claim 1 further comprising:
a content feedback generator for transmitting end user input data, associated with corresponding stream of content frames, to a central content source that is generating the corresponding stream of content frames via a path that extends from the wireless communication network to the central content source.

12. A method of operating a Forward Path Multi-Media Management System, operational in a wireless communication network which serves a plurality of wireless end user devices comprising:
simultaneously transmitting from a content distribution server, connected to a multi-casting wireless network that serves a plurality of wireless end user devices, a stream of content frames received from a content source to a group of wireless end user devices, comprising a set of selected ones of wireless end user devices, over a single unidirectional forward broadcast path of the multi-casting network that extends from the content distribution server to the selected wireless end user devices, wherein the stream of content frames comprise a series of frames that are delivered in sequence to the selected wireless end user devices and stored in a buffer, wherein past frames are frames delivered to the selected wireless end user devices and present frames are frames received by the content distribution server from the content source, stored in the buffer, but not yet delivered to the selected wireless end user devices;
transmitting, on a private reverse path which is concurrently operational with the unidirectional forward broadcast path, end user input data which is responsive to presently received centrally generated content to dynamically modify content to be transmitted to the selected wireless end user devices over the unidirectional forward broadcast path;
accumulating, in response to receipt of the end user input data received from the selected wireless end user devices over the reverse path, the end user input data to dynamically modify the content; and
generating a modified centrally generated content by modifying centrally generated content received from content sources based on the accumulated end user input data.

13. The method of claim 12 further comprising:
formatting the modified at least one present frame of the stream of content frames to be transmitted to a format consistent with display characteristics of the wireless end user devices, and
transmitting the modified at least one present frame of the stream of content frames to be transmitted to the wireless communication network for transmission over the unidirectional forward broadcast path to the selected wireless end user devices.

14. The method of claim 12 wherein the step of accumulating comprises:
associating the end user input data received from the end users with corresponding stream of content frames.

15. The method of claim 14 wherein:
the step of accumulating further comprises:
accumulating end user input data received from the end users for a corresponding centrally generated content.

16. The method of claim 15 wherein the step of generating further comprises:
operating at least one content integration application, responsive to receipt of the accumulated end user input data, for revising the received stream of content frames to produce revised stream of content frames.

17. The method of claim 16 further comprising:
transmitting end user input data, associated with corresponding stream of content frames, to a central content source that is generating the corresponding stream of content frames via a path that extends from the communication network to the central content source.

18. The method of claim 17 further comprising:
transmitting data from a central content source, which is generating the corresponding stream of content frames, via a path that extends from the central content source to the communication network to control operation of said content integration application.

19. The method of claim 14 wherein:
the step of accumulating further comprises:
defining a time period for use by the step of associating during which time period the end user input data received from the end users is associated with at least one of the present frames of the stream of content frames stored in the buffer.

20. The method of claim 19 wherein the step of accumulating further comprises:
processing the accumulated end user input data received from the end users to a composite content revision for stream of content frames.

21. The method of claim 20 wherein the step of generating further comprises:
revising, in response to receipt of the accumulated end user input data, the received stream of content frames to produce revised stream of content frames.

22. The method of claim 12 further comprising:
transmitting end user input data, associated with corresponding stream of content frames, to a central content source that is generating the corresponding stream of content frames via a path that extends from the wireless communication network to the central content source.

* * * * *